United States Patent
Lim et al.

(10) Patent No.: US 9,088,967 B2
(45) Date of Patent: Jul. 21, 2015

(54) WIRELESS COMMUNICATION SYSTEM AND CONNECTION METHOD BETWEEN USER EQUIPMENT AND A MOBILITY MANAGEMENT ENTITY

(75) Inventors: Chae Gwon Lim, Seoul (KR); Song Yean Cho, Seoul (KR); Beom Sik Bae, Suwon-si (KR); Han Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 13/577,750

(22) PCT Filed: Feb. 9, 2011

(86) PCT No.: PCT/KR2011/000866
§ 371 (c)(1),
(2), (4) Date: Aug. 8, 2012

(87) PCT Pub. No.: WO2011/099769
PCT Pub. Date: Aug. 18, 2011

(65) Prior Publication Data
US 2012/0302230 A1    Nov. 29, 2012

(30) Foreign Application Priority Data
Feb. 10, 2010   (KR) .................. 10-2010-0012548

(51) Int. Cl.
*H04W 4/00* (2009.01)
*H04W 76/02* (2009.01)
(Continued)

(52) U.S. Cl.
CPC ............ *H04W 76/021* (2013.01); *H04W 8/065* (2013.01)

(58) Field of Classification Search
CPC ..... H04W 8/02; H04W 36/0083; H04W 8/26; H04W 36/0005; H04W 64/00; H04W 76/021; H04W 8/00; H04W 72/005; H04W 72/048; H04W 72/0486
USPC ...................................... 455/422.1
See application file for complete search history.

(56) References Cited

U.S. PATENT DOCUMENTS

| 2004/0203775 | A1   | 10/2004 | Bourdeaut et al. |
| 2009/0252132 | A1 * | 10/2009 | Song et al. ............ 370/338 |

(Continued)

FOREIGN PATENT DOCUMENTS

| JP | EP 2285149     | * | 4/2006 |
| KR | 10-2007-0087129 A | | 8/2007 |

(Continued)

OTHER PUBLICATIONS
3GPP TS 22.368 V1.0.0 (Aug. 2009).*

*Primary Examiner* — Timothy Pham
(74) *Attorney, Agent, or Firm* — Jefferson IP Law, LLP

(57) ABSTRACT

The present invention relates to a wireless communication system and a connection method between user equipment and a mobility management entity and comprises: selecting a mobility management entity and requesting identification information for user equipment by a base station when the user equipment is connected; determining whether to assign identification information by the mobility management entity; and if the identification information is not assigned, selecting another mobility management entity by the mobility management entity, assigning identification information to the user equipment by the other mobility management entity, and performing a connection with the other mobility management entity by the user equipment. According to the present invention, user equipment can be efficiently connected with a mobility management entity in a wireless communication system.

15 Claims, 17 Drawing Sheets

(51) Int. Cl.
*H04W 72/00* (2009.01)
*H04W 8/06* (2009.01)

(56) References Cited

U.S. PATENT DOCUMENTS

2009/0318161 A1* 12/2009 Lopes ............................ 455/453
2010/0061301 A1* 3/2010 Antal et al. .................... 370/328
2010/0061331 A1* 3/2010 Guo et al. ..................... 370/329
2010/0105385 A1* 4/2010 Tanabe et al. ............... 455/435.1
2011/0158181 A1* 6/2011 Walker et al. ................. 370/329
2011/0265158 A1* 10/2011 Cha et al. .......................... 726/6
2012/0287854 A1* 11/2012 Xie et al. ...................... 370/328

FOREIGN PATENT DOCUMENTS

KR 10-2008-0106142 A 12/2008
WO WO 2009/149759 * 6/2008
WO PCT/CN2010/080317 * 1/2010

* cited by examiner

WIRELESS COMMUNICATION SYSTEM AND CONNECTION METHOD BETWEEN USER EQUIPMENT AND A MOBILITY MANAGEMENT ENTITY

BACKGROUND OF THE INVENTION

1. Field of the Invention

The present invention relates to a wireless communication system and method and, in particular, to a wireless communication system and a method for establishing a connection between a user equipment and a mobility management entity.

2. Description of the Related Art

Universal Mobile Telecommunications System (UMTS) is a third generation wireless communication system based on the Global System for Mobile communication (GSM) and General Packet Radio Services (GPRS) and using Wideband Code Division Multiple Access (WCDMA). The $3^{rd}$ Generation Partnership Project (3GPP) for UMTS has proposed Evolved Packet System (EPS) such as Long Term Evolution (LTE). LTE is a technology for high speed packet-based communication network. An LTE mobile communication system is provided with a Mobility Management Entity (MME) which is connected to the User Equipment (UE) and responsible for managing mobility of the UE.

DISCLOSURE OF INVENTION

Technical Problem

With the diversification of the communication services provided by the wireless communication system, the UE is also equipped with various supplementary functions. The MME is configured to support the supplementary functions of the UE. In order to use the communication service associated with a supplementary function, the UE has to connect to the MME supporting the supplementary function. There is therefore a need of a method for a UE to connect the MME supporting the corresponding supplementary function efficiently.

Solution to Problem

In accordance with an aspect of the present invention, a method for connection between a user equipment and a mobility management entity in a wireless communication system includes requesting, at a base station when a user equipment is connected, identity information for the user equipment to a mobility management entity; determining, at the mobility management entity, whether to allocate the identity information to the user equipment; requesting, when determined not to allocate the identity information, another mobility entity for the identity information; allocating, at the other mobility entity, the identity information to the user equipment; and attempting, at the user equipment, connection to the other mobility management entity with the identity information.

Preferably, determining includes judging whether the mobility management entity has a function supporting the user equipment; determining, when the mobility management entity has the function supporting the user equipment, allocation of the identity information; and determining, when the mobility management entity has no function supporting the user equipment, no allocation of the identity information.

Preferably, determining includes judging whether a load of the mobility management entity is greater than a predetermined threshold value; determining, when the load is greater than the threshold value, not allocation of the identity information; and determining, when the load is not greater than the threshold value, allocation of the identity information.

In accordance with another aspect of the present invention, a wireless communication system includes a user equipment having identity information; a mobility management entity which allocates the identity information to the user equipment, establishes a connection with the user equipment using the identity information, and manages mobility of the user equipment; and a base station which selects, when the user equipment is connected, the mobility management entity to request for the identity information, wherein the mobility management entity determines, when the base station request for the identity information, whether to allocate the identity information to the user equipment and requests, when determined not to allocate the identity information, another mobility entity for the identity information.

Preferably, the mobility management entity judges whether the mobility management entity has a function supporting the user equipment, determining, when the mobility management entity has the function supporting the user equipment, allocation of the identity information and, otherwise, no allocation of the identity information.

Preferably, the other mobility management entity judges whether a load of the mobility management entity is greater than a predetermined threshold value and determines, when the load is greater than the threshold value, not allocation of the identity information and, otherwise, allocation of the identity information.

Advantageous Effects

The wireless communication system and a method for establishing a connection between the UE and MME in the wireless communication system according to the present invention to solve the above problem is capable of establishing a connection between the UE and the MME efficiently. That is, through the cooperation between the base station and the MME or among the MMEs, it is possible to establish a connection between the UE and the MME efficiently.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
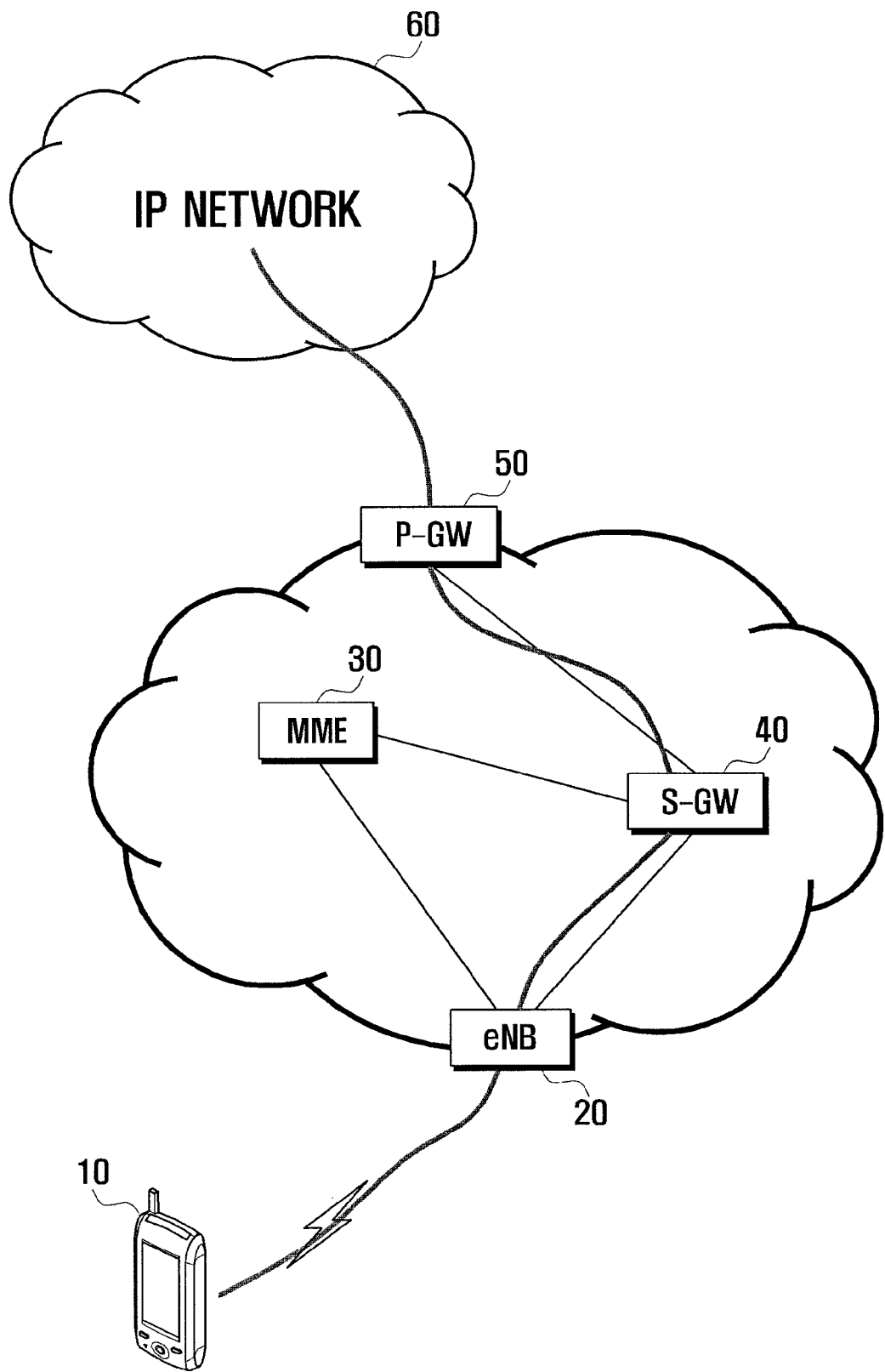
FIG. 1 is a block diagram illustrating a configuration of a wireless communication system according to an embodiment of the present invention.

FIG. 1 is a block diagram illustrating a configuration of a wireless communication system according to an embodiment of the present invention.

Referring to FIG. 1, the wireless communication system of this embodiment includes a UE 10, an enhanced Node B (eNB) 20, an MME 30, a Serving Gateway (S-GW) 40, and a Packet Data Network Gateway (P-GW) 50.

The UE 10 may be fixed or mobile. The UE 10 can be a normal UE for performing normal communication function or a Machine Type Communication (MTC) UE for performing MTC function. Here, MTC technology can be applied to smart metering for automated communication between the power company server and electric meter reader and alarm system for automated communication between the security company server and an illegal intrusion alarm.

The eNB 20 manages a cell. At this time, the eNB 20 is a macro eNB, and the cell is a macro cell as a cell of a typical cellular system. Here, the terms "eNB" and "cell" can be interchangeably used in the same meaning. The eNB 20 connects to the UE 10 through a radio channel and controls radio resource. For example, the eNB generates and broadcasts system information necessary for control within the cell and allocates radio resource for transmitting/receiving packet data or control information to/from the UE 10. The system information is capable of including carrier information (PLMN ID), eNB Cell Global ID (ECGI), and Tracking Area ID (TAI) of each cell. The eNB is capable of collecting channel measurement result information for the serving and neighbor cells to make a handover decision and command handover. In order to achieve this, the eNB 20 is provided with the control protocol such as Radio Resource Control Protocol related to the radio resource management.

The MME 30 manages UE 10 in idle mode and selects the S-GW 40 and the P-GW 50. The MME 30 is responsible for roaming and authentication functions. The MME 30 also processes bearer signals generated by the UE 10. In order to achieve this, the MME 30 allocates identity information to the UE 10 and manages the connection with the UE 10 using the identity information. At this time, the MME 30 can be a normal MME for supporting the normal UEs or a MTC MME for supporting the MTC UEs. Here, the MME 30 is cable of having a unique entity ID which allows for identifying the normal MME and MTC MME.

The MME 30 connects to the eNB 20 through a radio channel and connects to the UE 10 via the eNB 20. Here, the MME 30 connects to the eNB via S1-MME interface. At this time, the MME 30 communicates with the UE 10 using Non Access Stratum (NAS) message. The MME 30 supports a plurality of tracking areas and is connected with a plurality of eNBs 20 providing respective tracking area information. That is, a plurality of eNBs 20 providing the same tracking area information can be connected with the MME 30. It is also possible for the plural eNBs 20 proving different tracking area informations to connect to the respective MMEs 30. It is also possible for the plural eNBs 20 supporting different tracking areas to be connect to the same MME 30.

The S-GW 40 connects to the eNB 20 and the MME 30 through radio channels. Here, the S-GW 40 connects to the eNB 20 through S1-U interface. The S-GW 320 is responsible for the UE mobility control function. That is, when the UE 10 performs handover between eNBs or roams across 3gpp radio network networks, the S-GW 40 acts as a mobility anchor of the UE 10.

The P-GW 50 connects to the S-GW 40 through a radio channel. Here, the P-GW 50 connects to the S-GW via S5 interface. The P-GW 50 connects to the Internet Protocol (IP) network 60. The P-GW 50 is responsible for IP address allocation to the UE 10 and packet data-related functions. That is, the P-GW 50 delivers the packet data received through the IP network 60 to the UE 10 via the S-GW 40 and the eNB 20. When the UE moves between the 3GPP radio network and non-3GPP radio network, the P-GW 50 acts as the mobility anchor of the UE 10. The P-GW 50 also determines the bearer bandwidth for the UE 10 and performs packet data forward and routing function.

The wireless communication system is capable of further including a Home Subscriber Server (HSS) (not shown). The HSS stores the subscriber information per UE. When the UE 10 attempts attachment to the network, the HSS provides the MME 30 with the information related to the UE 10 for use in controlling the UE 10.

Once it has connected to the eNB 20 of the wireless communication system, the UE 10 connects to the IP network 60 through a data path consisting of the eNB 20, the S-GW 40, and the P-GW 50 so as to exchange packet data. The UE 10 is also capable of transmitting a NAS request to the MME 30 via the eNB 20. The NAS message is capable of including request including at least one of attach request, tracking area update request, or service request. Upon receiving the NAS request message, the eNB 20 selects MME 30 according to the Network Node Selection Function (NNSF) and sends the NAS request message to the selected MME 30. This is because the eNB 20 is capable of being connected to a plurality of MMEs 30 individually through S1-MME interface.

In this embodiment, although the description is directed to the case where the UE 10 is an MTC UE, the eNB 20 is connected to the respective normal MME and MTC MME, the present invention is not limited thereto. That is, although the normal UE is replaced by MTC UE implemented with a specific function and the MME is replaced by MTC MME implemented to support other type of UE, the present invention is applicable.

Figure 2:
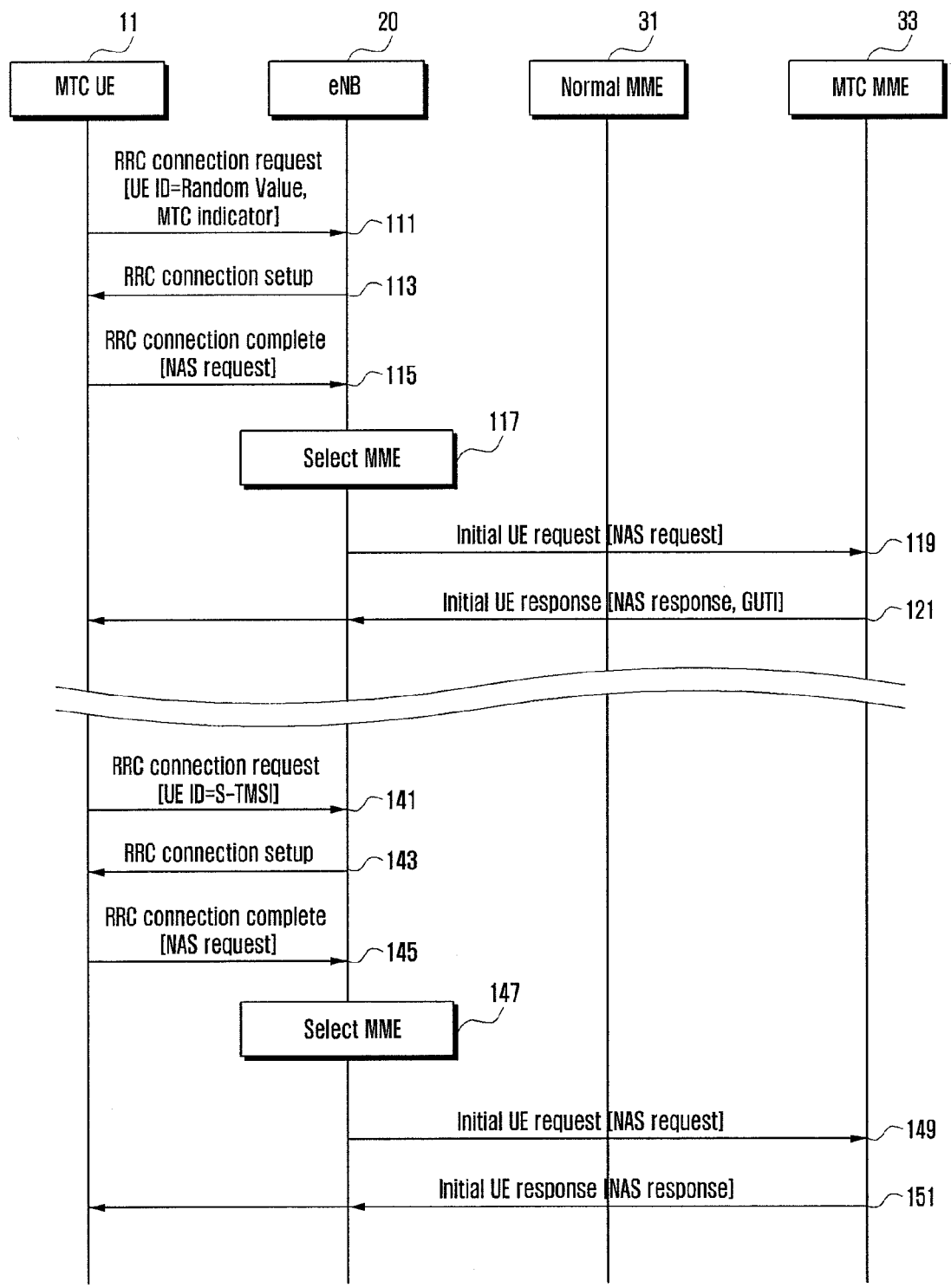
FIG. 2 is a signaling diagram illustrating a connection procedure in the wireless communication system according to the first embodiment of the present invention.

FIG. 2 is a signaling diagram illustrating a connection procedure in the wireless communication system according to the first embodiment of the present invention.

Referring to FIG. 2, the connection procedure between the MTC UE 11 and MTC MME 330 starts in such a way that the MTC UE 11 establishes an RRC connection with the eNB 20. When it attaches to the radio network initially or enters the cell supporting the tracking area information, the MTC UE 11 is capable of performing initial RRC connection to the eNB 20 to establish the connections to the MMEs 30, 31, and 33.

The MTC UE 11 sends the eNB 20 an RRC Connection Request message at step 111. Since it is the initial connection to the eNB 20, the MTC UE 11 sends the UE ID in the form of a Random Value through in the RRC connection request message. Upon receipt of the RRC connection request message, the eNB 20 sends the MTC UE 11 an RRC Connection Setup message at step 113. Upon receipt of the RRC Connection Setup message, the MTC UE 11 sends the eNB 20 an RRC Connection Setup Complete message at step 115. At this time, the MTC UE 11 transmits the NAS request message to the MTC MME 33 in the RRC Connection Setup Complete message. Here, the MTC UE 11 is capable of transmitting the RRC Connection Request message or the RRC Connection Setup Complete message with an MTC indicator for indicating that the UE is the MTC UE. The MTC UE 11 is also capable of inserting the entity ID of the MME entity 30, 31, or 33 to which it has connected previously in the RRC Connection Setup Complete message.

Once the connection has been established with the MTC UE 11, the eNB 20 selects one of a plurality of MMEs 30, 31, and 33 at step 117. At this time, the eNB 20 determines whether the RRC Connection Setup Complete message includes an entity ID. If an entity ID is included, the eNB selects the MME identified by the entity ID. If no entity ID is included, the eNB 20 selects an MME 30, 31, or 33 arbitrarily. If it has no S1-MME interface connection with the MME identified by the entity ID, the eNB 20 selects an MME 30, 31, or 33 arbitrarily. Here, the eNB 20 is capable of determining whether the RRC Connection Request message or the RRC Connection Setup Complete message includes the MTC indicator. If no MTC indicator is included, the eNB 20 selects the normal MME 31. Otherwise, if the MTC indicator is included, the eNB 20 selects the MTC MME 33.

Once the MTC MME 33 has been selected, the eNB 20 sends the MTC MME 33 an Initial UE message for the MTC UE 11 at step 119. At this time, the eNB 20 transmits the RRC Connection Setup Complete message in the NAS Request message. Upon receipt of the Initial UE Request message, the MTC MME 33 sends the MTC UE 11 an Initial UE Response message at step 121 via the eNB 20. At this time, the MTC MME 33 generates the NAS Response message by processing the request data in the NAS Request message. The MTC MME 33 also transmits the NAS Response message in the NAS message. The MTC MME 33 is capable of transmitting Global Unique Temporary ID (GUTI) as the identity information for the MTC UE 11 in the NAS response message. Here, the GUTI includes the information on the carrier supported by the eNB 20 connected currently to the MTC MME 33, MME Group ID of the MME 33, entity ID of the MTC MME 33, and MME-Temporary Mobile Subscriber ID (M-TMSI) which the MTC MME 33 allocates to the MTC UE 11; and the SAE Temporary Mobile Subscriber ID consists of the entity ID and M-TMSI.

Meanwhile, the MTC UE 11 is capable of re-attempting RRC connection with the eNB 20. That is, when it transitions from the idle mode to the active mode or enters a cell supporting the tracking area information that has been identified already, the MTC UE 11 is capable of attempting RRC connection to the eNB 20 for re-establishing the connection to the MME 30, 31, or 33 to which it has connected.

That is, the MTC UE 11 sends the eNB 20 the RRC Connection Request message at step 141. Since it is a retry for connection to the eNB 20, the MTC UE 11 includes the S-TMSI as the UE ID in the RRC Connection Request message. Upon receipt of the RRC Connection Request message, the eNB 20 sends the MTC UE 11 the RRC Connection Setup message at step 143. Upon receipt of the RRC Connection Setup message, the MTC UE 11 sends the eNB 20 the RRC Connection Setup Complete message at step 145. At this time, the MTC UE 11 transmits the NAS Request message for the MTC MME 33 in the RRC Connection Setup Complete message.

Once the MTC UE 11 has connected, the eNB 20 selects one of the plural MMEs 30, 31, and 33 at step 147. At this time, the eNB 20 determines whether the RRC Connection Setup Complete message includes the entity ID. If the entity ID is included, the eNB 20 selects the MME identified by the entity ID. That is, the eNB 20 checks the entity ID with S-TMSI included in the RRC Connection Request message and selects the entity matched with the entity ID. If no entity ID is included, the eNB 20 selects an MME 30, 31, or 33 arbitrarily. In case that it has not S1-MME interface connection with the MME identified by the entity ID, the eNB 20 selects an MME 30, 31, or 33 arbitrarily.

Once the MTC MME 33 has been selected, the eNB 20 sends the MTC MME 33 an Initial UE Request message for the MTC UE 11 at step 149. At this time, the eNB 20 transmits the NAS Request message carried in the RRC Connection complete message. Upon receipt of the Initial UE request message, the MTC MME 33 sends the MTC UE 11 an Initial UE Response message via the eNB 20 at step 151. At this time, the MTC MME 33 generates the NAS Response message by processing the request data in the NAS Request message. The MTC MME 33 transmits the NAS message including the NAS Response message.

The operation procedure between the MME 30, 31, and 33 and the eNB 20 according to an embodiment of the present invention is described hereinafter.

Figure 3:
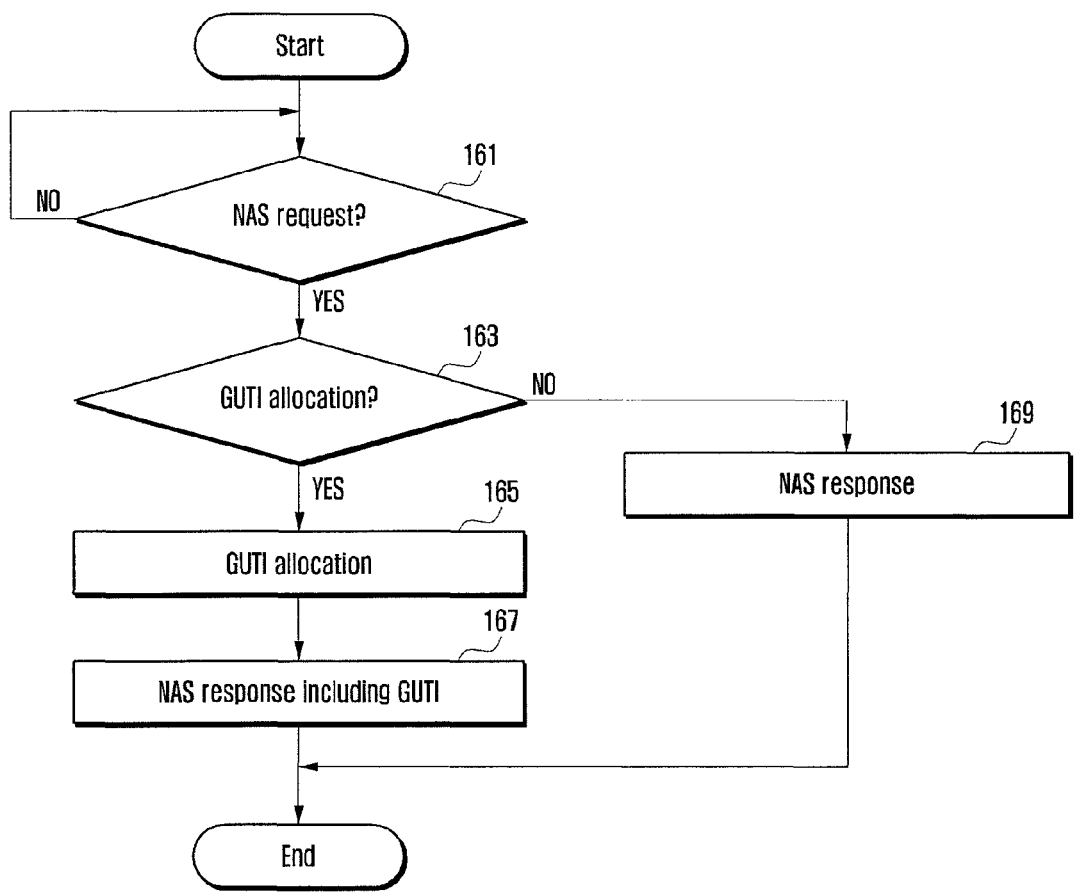
FIG. 3 is a flowchart illustrating the operation procedure of the MME of FIG. 2.

FIG. 3 is a flowchart illustrating the operation procedure of the MME 30, 31, or 33 of FIG. 2.

Referring to FIG. 3, if a NAS request message is received from the UE 10 or 11, the MME 30, 31, or 33 detects this at step 161 and determines whether to assign GUTO to the UE 10 or 11 at step 163. That is, the MME 30, 31, or 33 determines whether the GUTI has been assigned to the UE 10 or 11. If it is determined that the GUTI has not been assigned to the UE 10 or 11 at step 163, the MME 30, 31, or 33 assigns a GUTI to the UE 10 or 11 at step 165. The MME 30, 31, or 33 also sends the UE 10 or 11 the NAS Response message including the corresponding GUTI at step 167.

Otherwise, if it is determined that the GUTO has been assigned to the UE 10 or 11, the MME 30, 31, or 33 sends the UE 10 or 11 the NAS Response message via the eNB 20.

Figure 4:
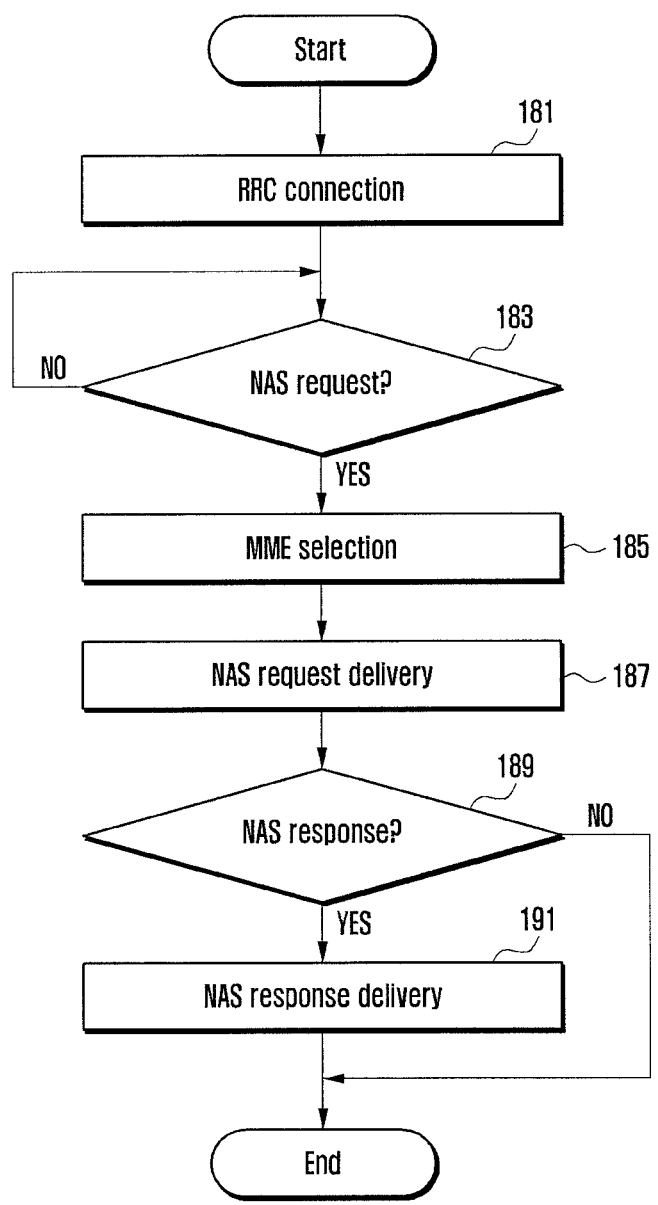
FIG. 4 is a flowchart illustrating the operation procedure of the eNB of FIG. 2.

FIG. 4 is a flowchart illustrating the operation procedure of the eNB 20 of FIG. 2.

Referring to FIG. 4, the eNB 20 of the present embodiment establishes an RRC connection with the UE 10 or 11 at step 181. If a NAS request message is received from the UE 10 or 11, the eNB 20 detects the message and selects an MME 30, 31, or 33 at step 185. If an entity IE is received along with the NAS request message, the eNB 20 selects the MME 30, 31, or 33 matched with the entity ID. If no entity ID is received, the eNB 20 selects an MME 30, 31, or 33 arbitrarily. If an MTC indicator is received along with the NAS request message, the eNB 20 selects the MTC MME 33. Otherwise, if no MTC indicator is received, the eNB 20 selects the normal MME 31. The eNB 20 sends the MME 30, 31, or 33 the NAS request message at step 187. If the NAS Response message is received from the MME 30, 31, 33, the eNB 20 detects this at step 189 and delivers the NAS response message to the UE 10 or 11 at step 191.

Although the above description has been directed to the exemplary case where the eNB 20 selects the MTC MME 33 for the MTC UE 11 in initial RRC connection with the MTC UE 11 in the first embodiment of the present invention, the present invention is not limited thereto. That is, when selecting an MME 30, 31, or 33 arbitrarily, although the eNB 20 selects the normal MME 31, the present invention can be implemented. Such examples are described in the second to sixth embodiments of the present invention.

Figure 5:
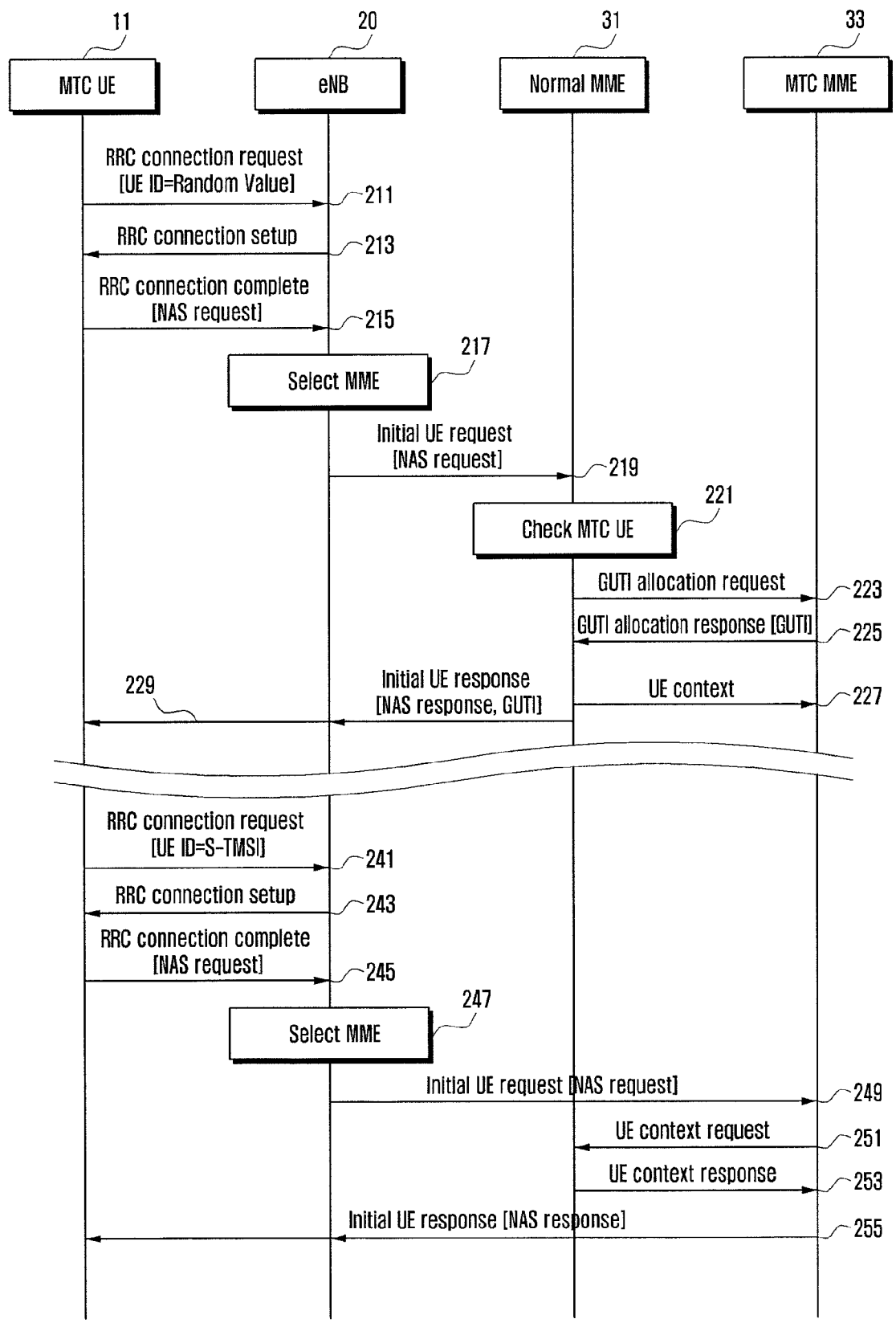
FIG. 5 is a signaling diagram illustrating a connection procedure in the wireless communication according to the second embodiment of the present invention.

FIG. 5 is a signaling diagram illustrating a connection procedure in the wireless communication according to the second embodiment of the present invention.

Referring to FIG. 5, the connection establishment procedure between the MTC UE 11 and the MTC MME 33 according the present embodiment starts in such a way that the MTC UE 11 attempts to establish an RRC connection to the eNB 20. When it attempts initial attachment to the radio network or enters a cell supporting the tracking area information, the MTC UE 11 is capable of establishing the initial RRC connection to the eNB 20 to connect to a new MME 30, 31, or 33.

The MTC UE 11 sends the eNB 20 an RRC connection request message at step 211. Since it is the initial connection to the eNB 20, the MTC UE 11 transmits a random value of the UE ID in the RRC connection request message. If the RRC connection request message is received, the eNB 20 sends an RRC connection setup message to the MTC UE 11 at step 213. In response to the RRC connection setup message, the UE 11 sends an RRC connection complete message to the eNB 20 at step 215. At this time, the MTC UE 11 transmits an NAS request message for the MTC MME 33 in the RRC connection complete message. Here, the MTC UE 11 is capable of inserting the entity ID of the MME 30, 31, or 33 to which it has connected in the RRC connection complete message.

If the MTC UE 11 has connected, the eNB 20 selects one of a plurality of MMEs 30, 31, and 33 at step 217. At this time, the eNB 20 determines whether the RRC connection complete message includes an entity ID. If an entity ID is included, the eNB 20 selects the MME 30, 31, or 33 identified by the entity ID. Otherwise, if no entity ID is included, the eNB 20 selects an MME 30, 31, or 33 arbitrarily. If there is no connection with the MME 30, 31, or 33 through the S1-MME interface, the eNB 20 selects an MME 30, 31, or 33 arbitrarily.

If the selected MME is the normal MME 31, the eNB 20 sends the normal MME 31 an initial UE request message for the MTC UE 11 at step 219. At this time, the eNB 20 transmits the NAS request message carried in the RRC connection complete message. If the initial UE request message in received, the normal MME 31 checks that the NAS request message is transmitted from the MTC UE 11 in the initial UE request message at step 221. For example, the eNB 20 delivers the MTC indicator received from the MTC UE 11 to the normal MME 31 such that the normal MME 31 identifies the MTC UE 11. Also, it is possible for the normal MME 31 to identify the MTC UE 11 based on the MTC indicator included in the subscriber information of the MTC UE 11 which is transmitted by the HSS. Also, it is possible for the normal MME 31 to identify the MTC UE 11 based on the random value selected in the range allowed for normal UE as UE ID.

Next, the normal MME 31 sends a GUTI allocation request message to the MTC MME 33 at step 223. That is, the normal MME 31 requests the MTC MME 33 for the GUTI of the MTC UE 11. In response to the GUTI allocation request message, the MTC MME 33 sends the normal MME 31 a GUTI allocation response message at step 225. That is, the MTC MME 33 provides the normal MME 331 with the GUTI as the identity information for the MTC UE 11. Here, the GUTI includes the information on the carrier supported by the eNB 20 connected currently to the MTC MME 33, MME Group ID of the MME 33, entity ID of the MTC MME 33, and MME-Temporary Mobile Subscriber ID (M-TMSI) which the MTC MME 33 allocates to the MTC UE 11; and the S-TMSI consists of the entity ID and M-TMSI. If the GUTI allocation response message is received, the normal MME 31 is capable of transmits UE context of the MTC UE 11 to the MTC MME 33 at step 227.

Next, the normal MME 31 sends the MTC UE 11 an initial UE response message via the eNB 20 at step 229. At this time, the normal MME 31 generates the NAS response message by processing the request data included in the NAS request message. The normal MME 31 also includes the GUTI for the MTC UE 11 in the NAS response message.

Meanwhile, the MTC UE 11 is capable of retries RRC connection to the eNB 20. That is, when it wakes up and transitions from the idle mode to the active mode or enters the cell supporting the tracking area information that has been identified already, the MTC UE 11 is capable of retrying RRC connection to the eNB 20 for reconnection to the MME 30, 31, or 33.

That is, the MTC UE 11 transmits the RRC connection request message to the eNB 20 at step 241. Since it is the retry for connection, the MTC UE 11 transmits the RRC connection request message configured with the S-TMSI as the UE ID. If the RRC connection request message is received, the eNB 20 sends the MTC UE 11 the RRC connection setup message at step 243. If the RRC connection setup message is received, the MTC UE 11 sends the RRC connection complete message to the eNB 20 at step 245. At this time, the MTC UE 11 transmits the NAS request message for the MTC MME 33 in the RRC connection complete message.

Once the MTC UE 11 has connected, the eNB 20 selects one of the plural MMEs 30, 31, or 33 at step 247. At this time, the eNB 20 determines whether the RRC connection complete message includes an entity ID. If an entity ID is included, the eNB 20 selects the MME identified by the entity ID. That is, the eNB 20 checks the entity ID based on the S-TMSI included in the RRC connection request message and selects the MME 30, 31, or 33 matched to the entity ID. If not entity ID is included, the eNB selects an MME 30, 31, or 33 arbitrarily. If there is no connection with the MME 30, 31, or 33 matched to the entity ID through S1-MME interface, the eNB 20 selects an MME 30, 31, or 33 arbitrarily.

Once the MTC MME 33 has been selected, the eNB 20 sends the MTC MME 22 the initial UE request message for the MTC UE 11 at step 249. Here, the eNB 20 transmits the NAS request message in the RRC connection complete message. If the initial UE request message is received, the MTC MME 33 is capable of sending the normal MME 31 a UE context request message for the MTC UE 11 at step 251. If the UE context request message is received, the normal MME 31 is capable of sending the MTC MME 33 a UE context response message including the UE context at step 253. Afterward, the MTC MME 33 sends the MTC UE 11 the initial UE response message via the eNB 20 at step 255. At this time, the MTC MME 33 generates the NAS message by processing the request data included in the NAS request message. The MTC MME 33 also transmits the NAS response message in the NAS message.

Descriptions are made of the operation procedures of the normal MME 31 and MTC MME 33 hereinafter. Since the operation procedure of the eNB 20 in the present embodiment is similar to that of the first embodiment of the present invention, detailed description thereon is omitted herein.

Figure 6:
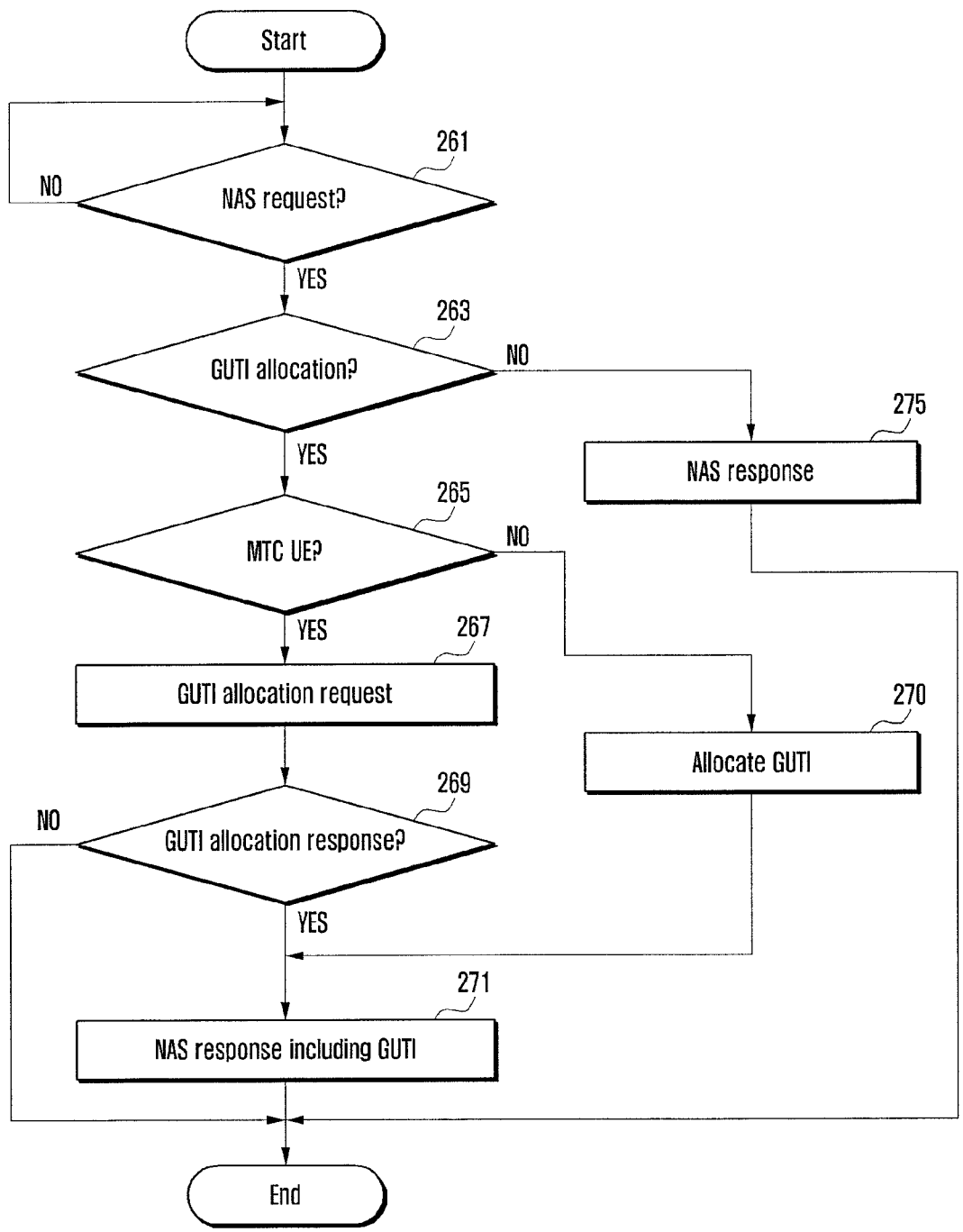
FIG. 6 is a flowchart illustrating the operation procedure of the normal MME of FIG. 5.

FIG. 6 is a flowchart illustrating the operation procedure of the normal MME 31 of FIG. 5.

Referring to FIG. 6, if an NAS request message is received from the UE 10 or 11, the normal MME 31 detects this at step 261 and determines whether to allocate GUTI to the UE 10 or 11 at step 263. That is, the normal MME 31 determines whether the UE 10 or 11 has been assigned the GUTI already. If it is determined to allocate GUTI at step 263, the normal MME 31 determines whether the UE 10 or 11 is the MTC UE 11 at step 265. If it is determined that the UE 10 or 11 is the MTC UE 11 at step 265, the normal MME 31 sends the MTC MME 33 a GUTI allocation request message at step 267. Afterward, if a GUTI allocation response message is received from the MTC MME 33, the normal MME 31 detects this at step 269 and sends the UE 10 or 11 a NAS response message including the corresponding GUTI at step 271.

Otherwise, if it is determined that the UE 10 or 11 is not the MTC UE 11 at step 265, the normal MME 31 allocates a GUTI to the UE 10 or 11 at step 270. Next, the normal MME 31 sends the UE 10 or 11 the NAS response message including the GUTI at step 271. If it is determined that there is no need to allocate GUTI to the UE 10 or 11 at step 263, the normal MME 31 sends the UE 10 or 11 a NAS response message via the eNB 20 at step 275.

Figure 7:
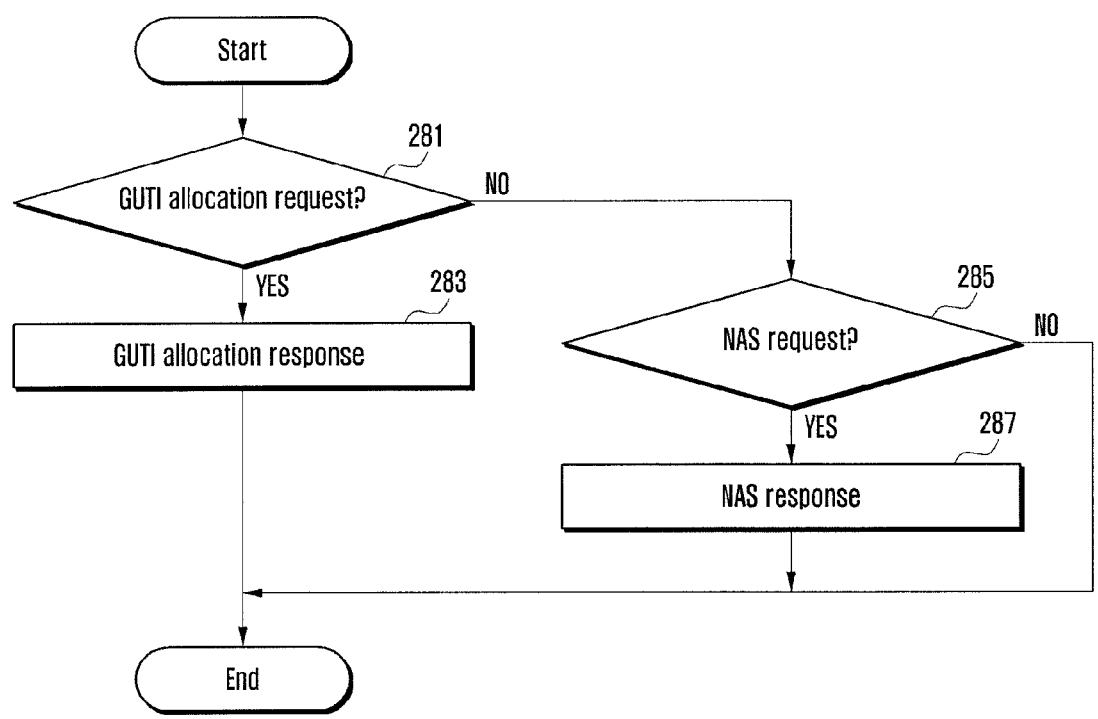
FIG. 7 is a flowchart illustrating the operation procedure of the MTC MME of FIG. 5.

FIG. 7 is a flowchart illustrating the operation procedure of the MTC MME 33 of FIG. 5.

Referring to FIG. 7, if a GUTI allocation request message is received from the normal MME 31, the MTC MME 33 detects this at step 281 and sends the normal MME 31 a GUTI allocation response message at step 283. If no GUTI allocation request message is received but a NAS request message is received from the UE 10 or 11, the MTC MME 33 detects this at step 285 and sends the UE 10 or 11 the NAS response message via the eNB 20 at step 287.

Although the description has been directed to the case where the normal MME 31 and MTC MME 33 communicate to each other directly in the second embodiment of the present invention, the present invention is not limited thereto. That is, even when the normal MME 31 and the MTC MME 33 are not communication directly, the present invention can be implemented. Such an example is described in the third embodiment of the present invention hereinafter.

Figure 8:
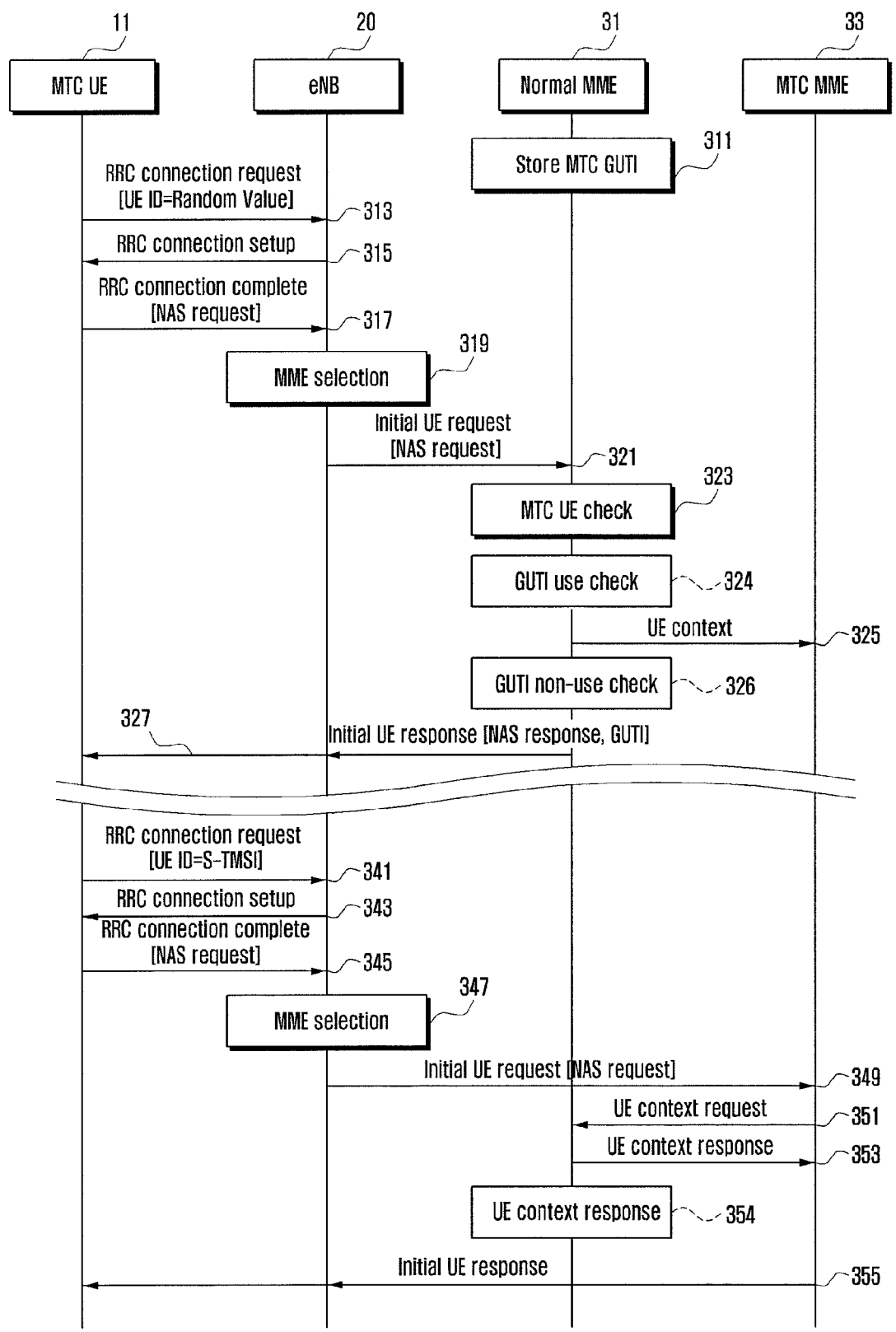
FIG. 8 is a signaling diagram illustrating a connection procedure in the wireless communication system according to the third embodiment of the present invention.

FIG. 8 is a signaling diagram illustrating a connection procedure in the wireless communication system according to the third embodiment of the present invention.

Referring to FIG. 8, the connection procedure between the MTC UE 11 and the MTC 33 according to the third embodiment starts in such a way that the normal MME 31 retains the list of GUTIs, i.e. MTC GUTIs, as the identity information that can be allocated by the MTC MME 33 at step 311. At this time, the MTC MME 33 sends the list of the MTC GUTIs directly to the normal MME 31 such that the normal MME 31 stores the MTC GUTI list. The MTC MME 33 registers the MTC GUTI list with an Operation and Management (O&M) server (not shown) which provides the normal MME 31 with the MTC GUTI such that the normal MME 31 is capable of storing the list of the MTC GUTIs. Here, the GUTI includes the information on the carrier supported by the eNB 20 connected currently to the MTC MME 33, MME Group ID of the MME 33, entity ID of the MTC MME 33, and MME-Temporary Mobile Subscriber ID (M-TMSI) which the MTC MME 33 allocates to the MTC UE 11; and the S-TMSI consists of the entity ID and M-TMSI.

Next, the MTC UE 11 attempts the RRC connection to the eNB 20. When it attempts initial attachment to the radio network or enters the cell supporting the tracking area information, the MTC UE 11 is capable of attempting the initial RRC connection to the eNB 20 to establishing connection to the MME 30, 31, or 33.

That is, the MTC UE 11 sends the eNB 20 an RRC connection request message at step 313. Since it is the initial attachment to the eNB 20, the MTC UE 11 sends a random value as the UE ID in the RRC connection request message. If the RRC connection request message is received, the eNB 20 sends the MTC UE 11 an RRC connection setup message at step 315. In response to the RRC connection setup message, the MTC UE 11 sends the eNB 20 an RRC connection complete message at step 317. At this time, the MTC UE 11 transmits a NAS request message for the MTC MME 33 in the RRC connection complete message. Here, the MTC UE 11 is capable of further including the entity ID of the MME 30, 31, or 33 to which it has connected previously in the RRC connection complete message.

Once the MTC UE 11 has connected, the eNB 20 selects one of the plural MMEs 30, 31, and 33 at step 319. At this time, the eNB 20 determines whether the RRC connection complete message includes an entity ID. If an entity ID is included, the eNB 20 selects the MME 30, 31, or 33 matched with the entity ID. Otherwise, if no entity ID is included, the eNB 20 selects an MME 30, 31, or 33 arbitrarily. If it is not connected to the MME 30, 31, or 33 match with the entity ID through S1-MME interface, the eNB selects an MME 30, 31, or 33 arbitrarily.

If the normal MME 31 is selected, the eNB 20 sends the normal MME 31 an initial UE request message addressed to the MTC UE 11 at step 321. At this time, the eNB 20 transmits the NAS request message carried in the RRC connection complete message. If the initial UE request message is received, the normal MME 31 checks that the NAS message carried in the initial UE request message has been transmitted by the MTC MME 11 at step 323. For example, the eNB 20 transmits the MTC indicator received from the MTC UE 11 to the normal MME 31 such that the normal MME 31 identifies the MTC UE 11. Also, it is possible for the HSS to transmit the MTC indicator in the subscriber information of the MTC UE 11 to the normal MME 31 such that the normal MME 31 identifies the MTC UE 11. Also, it is possible for the MTC UE 11 uses a random value selected in the range discriminated from that for the normal UE such that the normal MME 31 identifies the MTC UE 11. The normal MME 31 determines the GUTI for the MTC UE 11 from the MTC GUTI list and marks the GUTI as being used at step 324. The normal MME 31 is capable of transmitting the UE context of the MTC UE 11 to the MTC MME 33 at step 325 and then checking that the GUTI for the MTC UE 11 is not used from the MTC GUTI list at step 326.

Next, the normal MME 31 sends the MTC UE 11 an initial UE response message via the eNB 20 at step 327. At this time, the normal MME 31 generates a NAS response message by processing the request data in the NAS request message. The normal MME 31 transmits the NAS response message in the NAS message. The normal MME 31 is also capable of transmitting the GUTI selected from the MTC GUTI list in the NAS response message.

The MTC UE 11 is capable of retrying the RRC connection to the eNB 20. After wake-up from the idle mode when it transitions from the idle mode to the active mode or enters the cell supporting the tracking area information that has been identified already, the MTC UE 11 is capable of retrying the RRC connection to the eNB 20 to reestablish the connection to the MME 30, 31, or 33 to which it has connected previously.

That is, the MTC UE 11 sends the eNB 20 an RRC connection request message at step 341. Since it is the retry of the connection to the eNB 20, the MTC UE 11 transmits the RRC connection request message with the 5-TMSI as the UE ID. If the RRC connection request message is received, the eNB 20 sends the MTC UE 11 an RRC connection setup message at step 343. In response to the RRC connection setup message, the MTC UE 11 sends the eNB 20 an RRC connection complete message at step 345. At this time, the MTC UE 11 transmits the NAS request message for the MTC MME 33 in the RRC connection complete message.

If the MTC UE 11 has connected, the eNB 20 selects one of the plural MMEs 30, 31, and 33 at step 347. At this time, the eNB determines whether the RRC connection complete message includes an entity ID. If an entity ID is included, the eNB 20 selects the MME 30, 31, or 33 matched with entity ID. That is, the eNB 20 checks the entity ID based on the S-TMSI included in the RRC connection request message and selects the MME 30, 31, or 33 matched with the entity ID. If no entity ID is included, the eNB 20 selects an MME 30, 31, or 33 arbitrarily. Also, if it has not connected to the MME 30, 31, or 33 matched with the entity ID through S1-MME interface, the eNB 20 selects an MME 30, 31, or 33 arbitrarily.

Once the MTC MME 33 has been selected, the eNB 20 sends the MTC MME 33 an initial UE request message for the MTC UE 11 at step 349. Here, the eNB 20 transmits the NAS request message carried in the RRC connection complete message. If the initial UE request message is received, the MTC MME 33 is capable of transmitting a UE context request message for the MTC UE 11 to the normal MME 31 at step 351. If the UE context request message is received, the normal MME 31 sends the MTC MME 33 a UE context response message including the UE context at step 353 and marks the GUTI for the MTC UE 11 as not being used in the MTC GUTI list at step 354. Although not depicted, when the UE context request message is received, the normal MME 31 is capable of checking the GUTI for the MTC UE 11 as being not used in the MTC GUTI list and then transmits the UE context response message. Afterward, the MTC MME 33 sends the MTC UE 11 an initial UE response message via the eNB 20 at step 355. At this time, the MTC MME 33 generates the NAS response message by processing the request data in the NAS request message. The MTC MME 33 transmits the NAS response message in the NAS message.

A description is made of the operation procedure of the normal MME 31 according to this embodiment hereinafter. Since the operation procedures of the eNB 20 and the MTC MME 33 according to this embodiment are similar to those in the first embodiment, detailed descriptions thereon are omitted herein.

Figure 9:
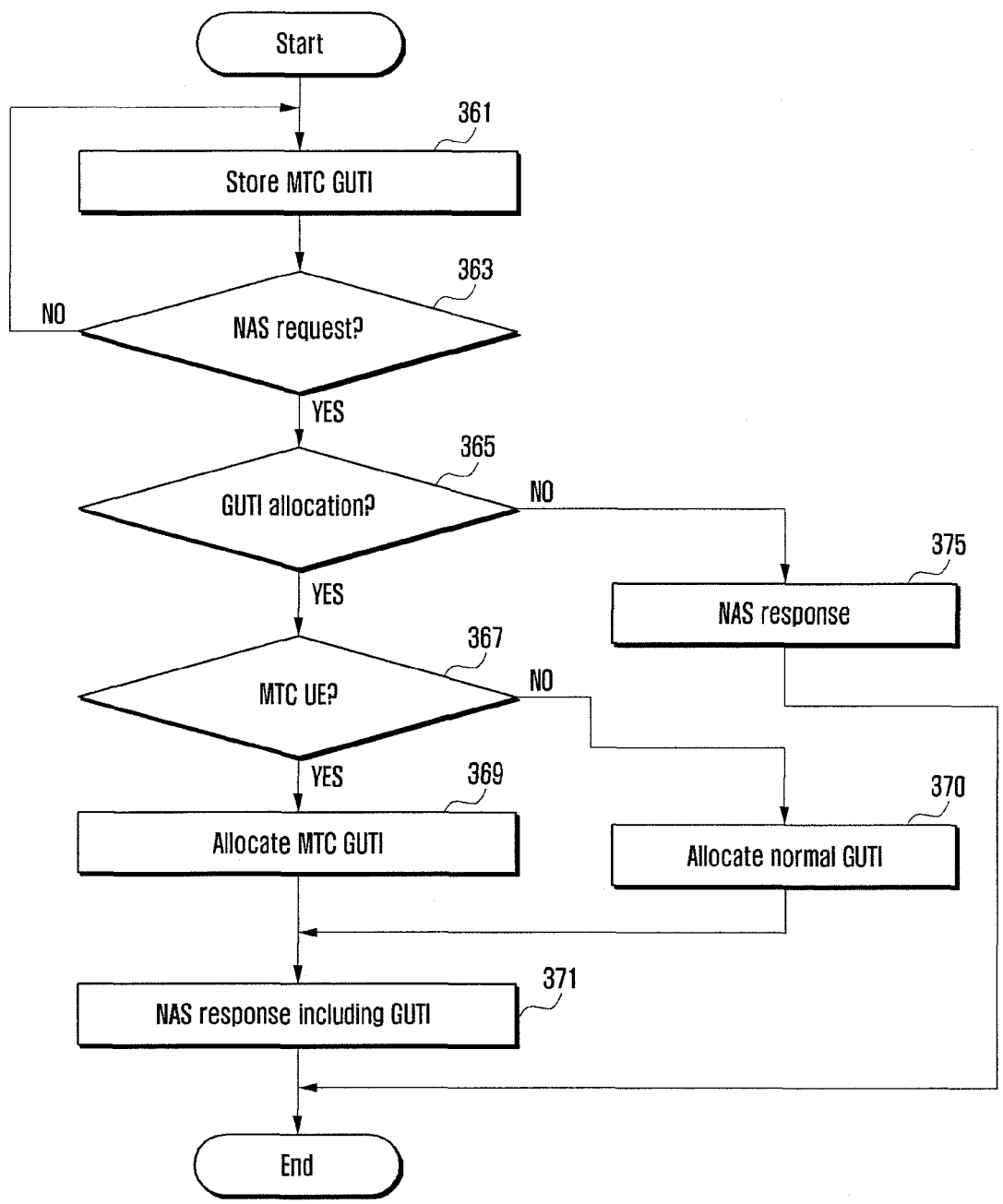
FIG. 9 is a flowchart illustrating the operation procedure of the normal MME of FIG. 8.

FIG. 9 is a flowchart illustrating the operation procedure of the normal MME 31 of FIG. 8.

Referring to FIG. 9, the normal MME 31 retains the MTC GUTI list in the embodiment at step 361. At this time, the normal MME 31 also stores a list of GUTIs that the normal MME 31 can allocate, i.e. normal GUTI list in addition to the MTC GUTI list. If a NAS request message is received from the UE 10 or 11, the normal MME 31 detects this and determines whether to allocate GUTI to the UE 10 or 11 at step 363. That is, the normal MME 31 determines whether it has allocated a GUTI to the UE 10 or 11 previously. If it is determined to allocate a GUTI to the UE 10 or 11 at step 365, the normal MME 31 determines whether the UE 10 or 11 is an MTC UE 11 at step 367. If it is determined that the UE 10 or 11 is the MTC UE 11 at step 367, the normal MME 31 allocates an GUTI selected from the MTC GUTI list to the UE 10 or 11. Afterward, the normal MME 31 sends the UE 10 or 11 a NAS response message including the corresponding GUTI at step 371.

Otherwise, if it is determined that the UE 10 or 11 is not the MTC UE 11 at step 367, the normal MME 31 allocates the GUTI selected from the normal GUTI rest to the UEs 10 or 11 at step 370. Next, the normal MME 31 sends the UE 10 or 11 the NAS response message including the corresponding GUTI at step 371. If it is not necessary to allocate a GUTI to the UE 10 or 11 at step 365, the normal MME 31 sends the UE 10 or 11 the NAS response message via the eNB 20 at step 375.

Although the description has been directed to the case where normal MME 31 delivers the GUTI allocated by the MTC MME 33 to the MTC UE 11 in the initial RRC connection between the MTC UE 11 and the eNB 20 in the second and third embodiments, the present invention is not limited thereto. That is, the present invention can be implemented in such a way that the MTC MME 33 is capable of allocating and transmitting the GUTI for the MTC UE 11. Such an example is described hereinafter in the fourth embodiment of the present invention.

Figure 10:
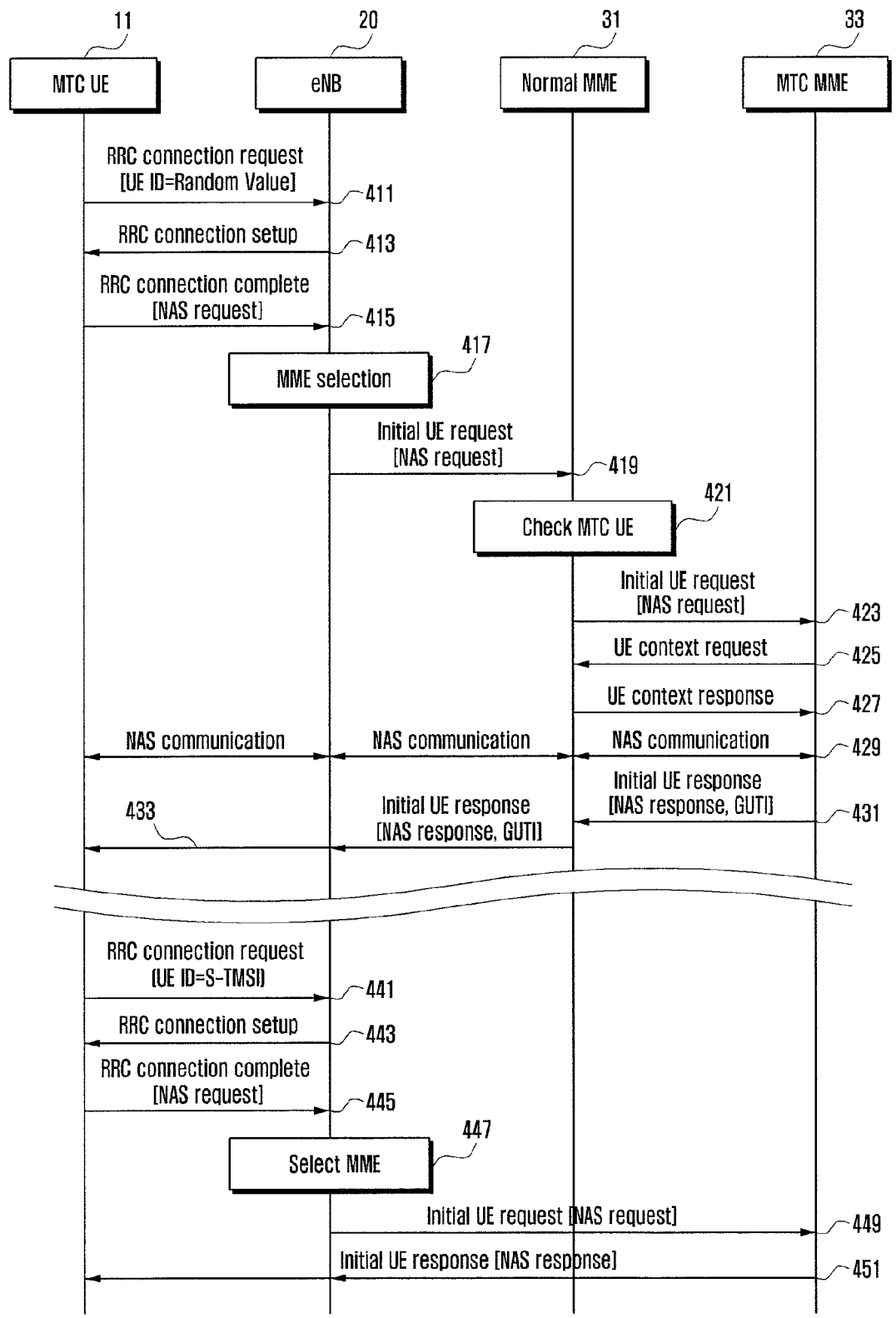
FIG. 10 is a signaling diagram illustrating a connection procedure in the wireless communication system according to the fourth embodiment of the present invention.

FIG. 10 is a signaling diagram illustrating a connection procedure in the wireless communication system according to the fourth embodiment of the present invention.

Referring to FIG. 10, the connection procedure between the MTC UE 11 and the MTC MME 33 according to the this embodiment starts in such a way that the MTC UE 11 attempts RRC connection to the eNB 20. At this time, when it tries initial attachment to the radio network or enters the cell supporting the tracking area information, the MTC UE 11 is capable of initial RRC connection to the eNB 20 to establish the connection to a new MME 30, 31, or 33.

That is, the MTC UE 11 sends the eNB 20 the RRC connection request message at step 411. Since it is the initial attachment, the MTC UE 11 transmits a random value as the UE ID in the RRC connection request message. If the RRC connection request message is received, the eNB 20 sends the MTC UE 11 an RRC connection setup message at step 413. If the RRC connection setup message is received, the MTC UE 11 sends an RRC connection complete message to the eNB 20 at step 415. At this time, the MTC UE 11 transmits a NAS request message for the MTC MME 33 in the RRC connection complete message. here, the MTC UE 11 is capable of further including the entity ID of the MME 30, 31, or 33 to which is has connected previously in the RRC connection complete message.

Once the MTC UE 11 has connected, the eNB 20 selects one of a plurality of MMEs 30, 31, and 33 at step 417. At this time, the eNB 20 determines whether the RRC connection complete message includes an entity ID. If an entity ID is included, the eNB 20 selects the MME 30, 31, or 33 matched with the entity ID. If no entity ID is included, the eNB 20 selects an MME 30, 31, or 33 arbitrarily. Also, if it has not connected to the MME 30, 31, or 33 matched with the entity ID via S1-MME interface, the eNB 20 selects an MME 30, 31, or 33 arbitrarily.

Once the normal MME 31 has been selected, the eNB 20 sends the normal MME 31 an initial UE request message for the MTC UE 11 at step 419. At this time, the eNB 20 transmits the NAS request message carried in the RRC connection complete message. If the initial UE request message is received, the normal MME 31 determines whether the NAS request message carried in the initial UE request message is transmitted by the MTC UE 11 at step 421. For example, the eNB 20 transmits the MTC indicator received from the MTC UE 11 to the normal MME 31 such that the normal MME 31 identifies the MTC UE 11. Also, it is possible for the HSS to transmit the MTC indicator in the subscriber information of the MTC UE 11 such that the normal MME 31 identifies the MTC UE 11. Also, it is possible for the MTC UE 11 to use a random value selected in the range discriminated from that for the normal UE such that the normal MME 31 identifies the MTC UE 11.

Next, the normal MME 31 sends the MTC MME 33 an initial UE request message for the MTC UE 11 at step 423. Here, the normal MME 31 is capable of transmitting the initial UE request message using the tunneling technique. If the initial UE request message is received, the MTC MME 33 is capable of transmitting to the normal MME 31 a UE context request message for the MTC UE 11 additionally at step 425. If the UE context request message is received, the normal MME 31 is capable of transmitting a UE context response message including the UE context to the MTC MME 33 at step 427. Here, the MTC MME 33 and the MTC UE 11 are capable of perform NAS communication via the eNB 20 and the normal MME 31 at step 429. That is, the MTC MME 33 and the MTC UE 11 are capable of generating and exchanging NAS messages. Here, the normal MME 31 is capable of exchanging the NAS messages with the MTC MME 33 using the tunneling technique.

Next, the MTC MME 33 sends the normal MME 31 an initial UE response message at step 431. At this time, the MTC MME 33 generates the NAS response message by processing the request data in the NAS request message. Here, the MTC MME 33 is capable of transmitting the NAS response message using the tunneling technique. The MTC MME 33 is capable of transmitting the GUTI allocated as identity information of the MTC UE 11 in the NAS response message. Afterward, if the initial UE response message is received, the normal MME 31 transmits the initial UE response message to the MTC UE 11 via the eNB 20 at step 433.

Meanwhile, the MTC UE 11 is capable of retrying RRC connection to the eNB 20. After wake-up from the idle mode, when it transitions from the idle mode to the active mode or enters the cell supporting the tracking area information which has been known already, the MTC UE 11 is capable of retrying the RRC connection to the eNB 20 for reestablishing the connection to the MME 30, 31, or 33 to which the MTC MME has connected previously.

That is, the MTC UE 11 sends the eNB 20 the RRC connection request message at step 441. Since it is reconnection to the eNB 20, the MTC UE 11 transmits the RRC connection request message in which the UE ID is set to the S-TMSI. If the RRC connection request message is received, the eNB 20 sends the MTC UE 11 an RRC connection setup message at step 443. If the RRC connection setup message is received, the MTC UE 11 sends the eNB 20 an RRC connection complete message at step 445. At this time, the MTC UE 11 transmits the NAS request message for the MTC MME 33 in the RRC connection complete message.

Once the MTC terminal 11 has connected, the eNB 20 selects one of the plural MMEs 30, 31, and 33 at step 447. At this time, the eNB 20 determines whether the RRC connection complete includes an entity ID. If an entity ID is included, the eNB 20 selects the MME 30, 31, or 33 matched with the entity ID. That is, the eNB 20 checks the entity ID from the S-TMSI of the RRC connection request message and selects the MME 30, 31, or 33 matched with the entity ID. Otherwise, if no entity ID is included, the eNB 20 selects an MME 30, 31, or 33 arbitrarily. Also, if it has not connected to the MME 30, 31, or 33 matched with the entity ID, the eNB 20 selects an MME 30, 31, or 33 arbitrarily.

Once the MTC MME 33 has been selected, the eNB 20 sends the MTC MME 33 an initial UE request message for the MTC UE 11 at step 449. Here, the eNB 20 transmits the NAS request message carried in the RRC connection complete message. If the initial UE request message is received, the MTC MME 33 sends the MTC UE 11 an initial UE response message via the eNB 20 at step 451. At this time, the MTC MME 33 generates the NAS response message by processing the request data in the NAS request message. The MTC MME 33 transmits the NAS response message in the NAS message.

A description is made of the operation procedure of the normal MME 31 according to this embodiment hereinafter. Since the operation procedures of the eNB 20 and the MTC MME 33 according to this embodiment are similar to those of the first embodiment of the present invention, detailed descriptions thereon are omitted herein.

Figure 11:
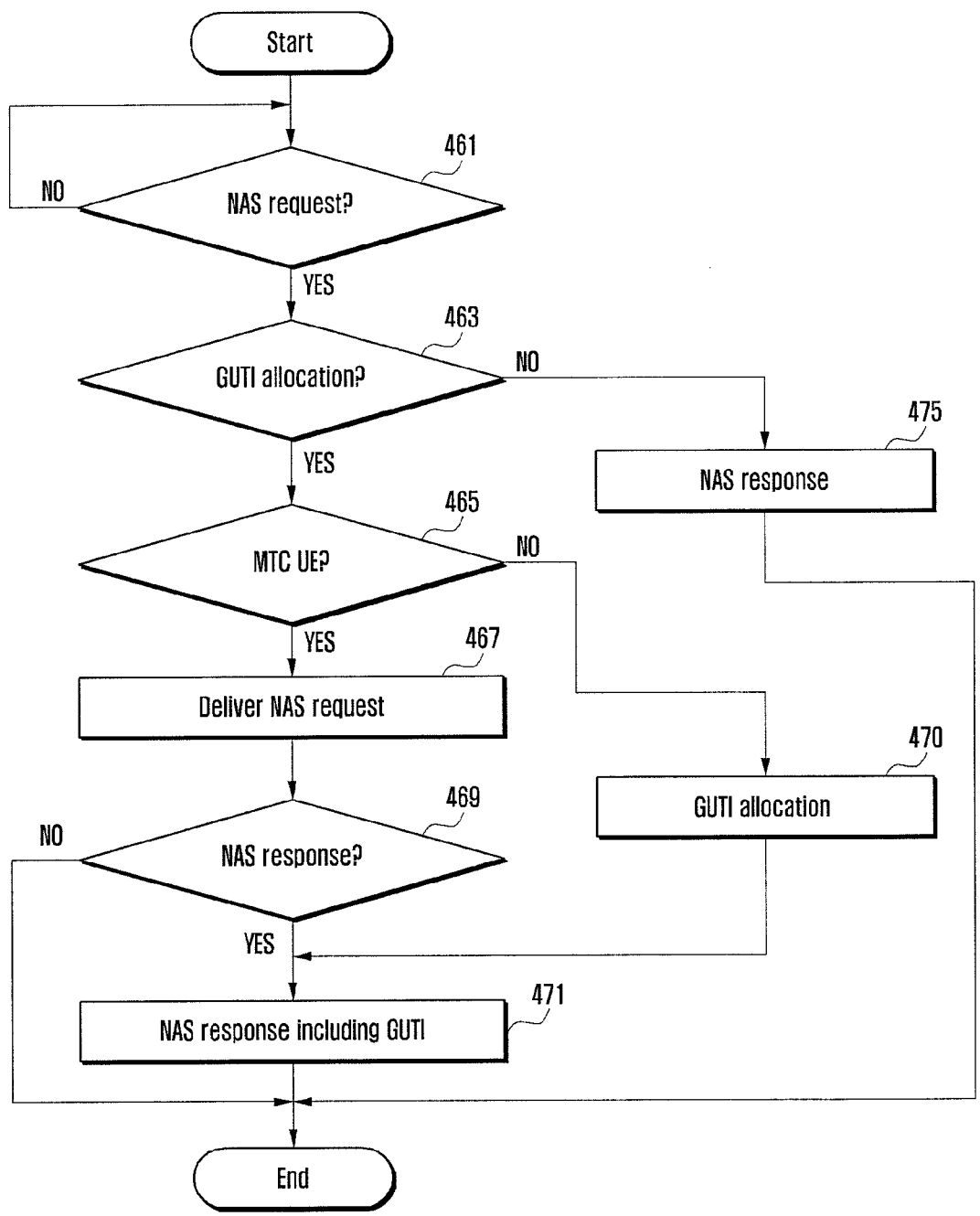
FIG. 11 is a flowchart illustrating the operation procedure of the normal MME of FIG. 10.

FIG. 11 is a flowchart illustrating the operation procedure of the normal MME 31 of FIG. 10.

Referring to FIG. 11, if an NAS request message is received from the UE 10 or 11, the normal MME 31 detects this at step 461 and determines whether to allocate a GUTI to the UE 10 or 11 at step 463. That is, the normal MME 31 determines whether the UE 10 or 11 has been allocated a GUTI already. If it is determined that the UE 10 or 11 has been allocated a GUTI already at step 463, the normal MME 31 determines whether the UE 10 or 11 is the MTC UE 11 at step 465. If it is determined that the UE 10 or 11 is the MTC UE 11 at step 465, the normal MME 31 sends the MTC MME 33 a NAS request message at step 467. Afterward, if an NAS response message including the GUTI for the UE 10 or 11 is received, the normal MME 31 detects this at step 469 and delivers the NAS response message including the corresponding GUTI to the UE 10 or 11 at step 471.

Otherwise, if it is determined that the UE 10 or 11 is not the MTC UE 11 at step 465, the normal MME 31 allocates a GUTI for the UE 10 or 11 at step 470. The normal MME 31 delivers the NAS response message to the UE 10 or 11 at step 471. At this time, the normal MME 31 transmits the NAS response message including the corresponding GUTI. If it is determined that there is no need to allocate a GUTI to the UE 10 or 11 at step 463, the normal MME 31 sends the UE 10 or 11 the NAS response message via the eNB 20.

Although the description is directed to the case, when the eNB 20 selects the MME 30, 31, or 33 for the MTC UE 11, the MME 30, 31, or 33 performs operation for allocating GUTI to the MTC 11 in the second to fourth embodiments of the present invention, the present invention is not limited thereto. That is, the present invention is capable of being implemented in such a way that, as well as the MME 30, 31, or 33, the eNB 20 performs the operation for allocation GUTI to the MTC UE 11. Such examples are described in the fifth and sixth embodiments of the present invention hereinafter.

Figure 12:
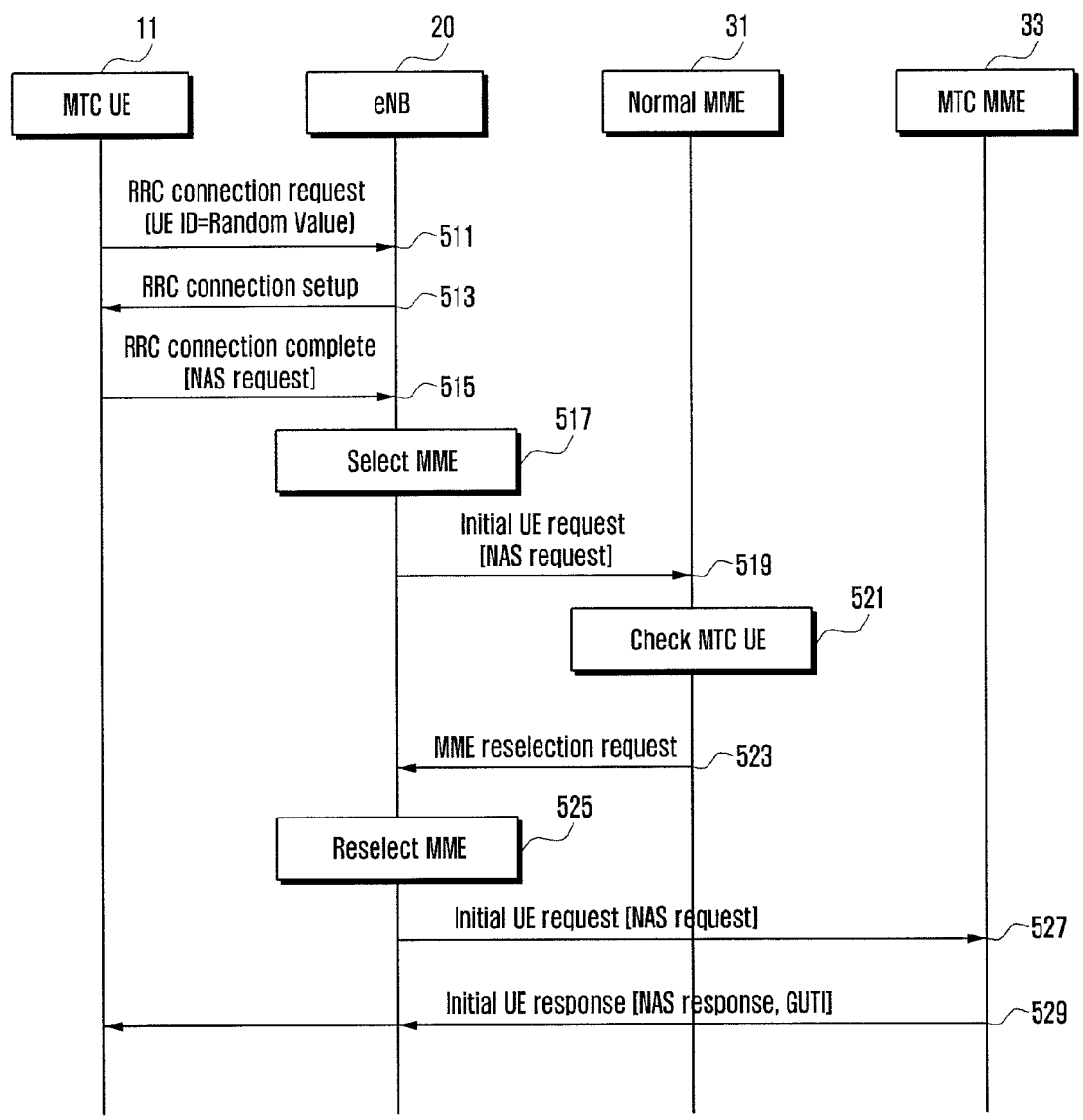
FIG. 12 is a signaling diagram illustrating the connection procedure in the wireless communication system according to the fifth embodiment of the present invention.

FIG. 12 is a signaling diagram illustrating the connection procedure in the wireless communication system according to the fifth embodiment of the present invention.

Referring to FIG. 12, the connection procedure between the MTC UE 11 and the MTC MME 33 according to this embodiment starts in such a way that the MTC UE 11 attempts RRC connection to the eNB 20. When it attempts initial connection to the radio network or enters a cell supporting the tracking area information which has not been recognized, the MTC UE 11 is capable of attempting initial RRC connection to the eNB 20 to establish the connection to a new MME 30, 31, or 33.

That is, the MTC UE 11 sends the eNB 20 an RRC connection request message at step 511. Since it is the attempt for initial attachment to the eNB 20, the MTC UE 11 transmits the RRC connection request message including a random value set as the UE ID. If the RRC connection request message is received, the eNB 20 sends the MTC UE 11 an RRC connection setup message at step 513. If the RRC connection setup message is received, the MTC UE 11 sends the eNB 20 an RRC connection complete message at step 515. At this time, the MTC UE 11 transmits the NAS request message for the MTC MME 33 in the RRC connection complete message. Here, the MTC UE 11 is capable of transmitting the RRC connection complete message including the entity ID of the MME 30, 31, or 33 to which it has connected previously.

Once the MTC UE 11 has connected, the eNB 20 selects one of the plural MMEs 30, 31, and 33 at step 517. At this time, the eNB determines whether the RRC connection complete message includes an entity ID. If an entity ID is included, the eNB 20 selects the MME entity 30, 31, or 33 matched with the entity ID. If no entity ID is included, the eNB 20 selects an MME 30, 31, or 33 arbitrarily. Also, if it has not connected to the MME 30, 31, or 33 matched with the entity ID via S1-MME interface, the eNB 20 selects an MME 30, 31, or 33 arbitrarily.

If the normal MME 31 has been selected, the eNB 20 sends the normal MME 31 an initial UE request message for the MTC UE 11 at step 519. At this time, the eNB 20 transmits the NAS request message carried in the RRC connection complete message. Here, the eNB 20 is capable of storing the initial UE request message or the NAS request message. If the initial UE request message is received, the normal MME 31 checks that the NAS request message carried in the initial UE request message has been transmitted by the MTC UE 11 at step 521. For example, the eNB 20 is capable of transmitting the MTC indicator received from the MTC UE 11 to the normal MME 31 such that the normal MME 31 identifies the MTC UE 11. Also, it is possible for the HSS to transmit the MTC indicator in the subscriber information of the MTC UE 11 such that the normal MME 31 identifies the MTC UE 11. Also, it is possible for the MTC UE 11 to use a random value selected in the range discriminated from that for the normal UE such that the normal MME 31 identifies the MTC UE 11.

Next, if the MTC UE 11 has been identified, the normal MME 31 sends the eNB 20 an MME reselection request (UE Redirect Request) message at step 523. At this time, the normal MME 31 in capable of transmitting the MME reselection request message including the information on the MTC MME 33, e.g. entity ID. Here, the normal MME 31 is capable of transmitting the NAS request message of the MTC UE 11 in the MME reselection request message.

Next, if the MME reselection request message is received, the eNB 20 selects one of the plural MMEs 30, 31, and 33 at step 525. At this time, the eNB selects the MTC MME 33. Herein, the eNB 20 determines whether the MME reselection request message includes an entity ID. If an entity ID is included, the eNB 20 selects the MTC MME 33 matched to the entity ID. Otherwise, if no entity ID is included, the eNB 20 selects an MTC MME 33 arbitrarily. Also, if it has not connected to the MME 33 matched with the entity ID via S1-MME interface, the eNB 20 selects the MTC MME 33 arbitrarily.

Next, if the MTC MME 33 has been selected, the eNB 20 sends the MTC MME 33 an initial UE request message for the MTC UE 11 at step 527. The MTC MME 33 sends the MTC UE 11 an initial UE response message via the eNB 20 at step 529. At this time, the MTC MME 33 generates the NAS response message by processing the request data in the NAS request message. The MTC MME 33 transmits the NAS response message in the NAS message. The MTC MME 33 is also capable of transmitting the NAS response message including the GUTI allocated as the identity information of the MTC UE 11.

The MTC UE 11 is capable of retrying RRC connection to the eNB 20. That is, after wake-up from the idle mode, when it transitions from the idle mode to the active mode or enters a cell supporting the tracking area information which has not been recognized until then, the MTC UE 11 is capable of retrying RRC connection to the eNB 20 to reestablish the connection to the MME 30, 31, or 33 to which it has connected previously. Next, the MTC UE 11 is capable of attempting connection to the MTC MME 33 via the eNB 20. Since the connection procedure between the MTC UE 11 and the MTC MME 33 is similar to steps 441 to 451 of FIG. 10, detailed description thereon is omitted herein.

Descriptions are made of the operation procedures of the normal MME 31 and the eNB 20 according to the present embodiment hereinafter. Since the operation procedure of the MTC MME 33 according to this embodiment is similar to that of the first embodiment of the present invention, detailed description thereon is omitted herein.

Figure 13:
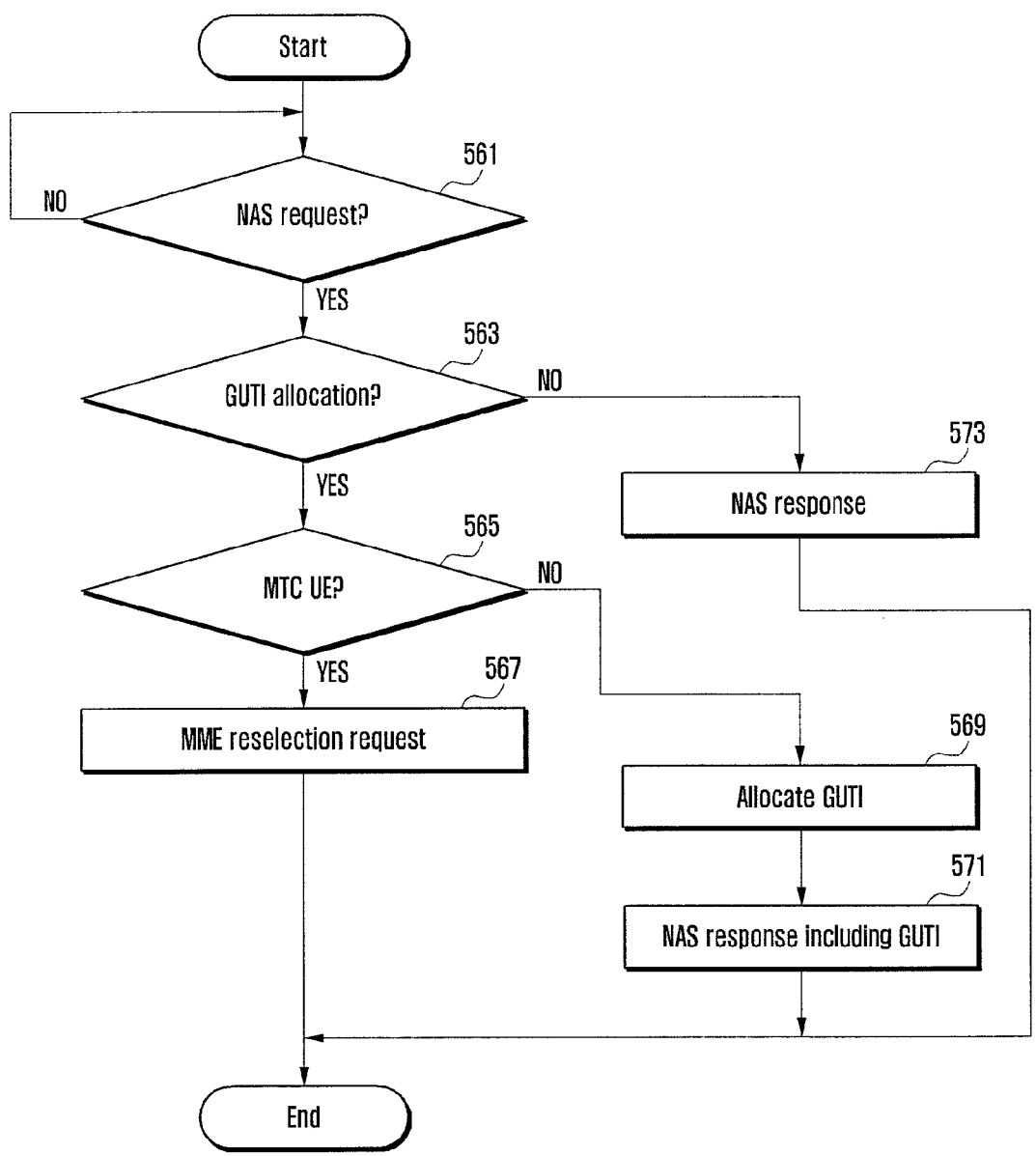
FIG. 13 is a flowchart illustrating the operation procedure of the normal MME of FIG. 12.

FIG. 13 is a flowchart illustrating the operation procedure of the normal MME 31 of FIG. 12.

Referring to FIG. 13, if the NAS request message is received from the UE 10 or 11, the normal MME 31 detects this at step 561 and determines whether to allocate a GUTI to the UE 10 or 11 at step 563. That is, the normal MME 31 determines whether the UE 10 or 11 has been allocated a GUTI already. If it is determined to allocate a GUTI to the UE 10 or 11 at step 563, the normal MME 31 determines whether the UE 10 or 11 is the MTC UE 11 at step 565. If it is determined that the UE 10 or 11 is the MTC UE 11, the normal MME 31 sends the eNB an MME reselection request message at step 567.

Otherwise, if it is determined that the UE 10 or 11 is not the MTC UE 11 at step 565, the normal MME 31 allocates a GUTI to the UE 10 or 11 at step 569. Next, the normal MME 31 sends the UE 10 or 11 a NAS response message at step 571. At this time, the normal MME 31 transmits the NAS response message including the corresponding GUTI. If it is determined not to allocate a GUTI to the UE 10 or 11 at step 563, the normal MME 31 sends the UE 10 or 11 a NAS response message via the eNB 20 at step 573.

Figure 14:
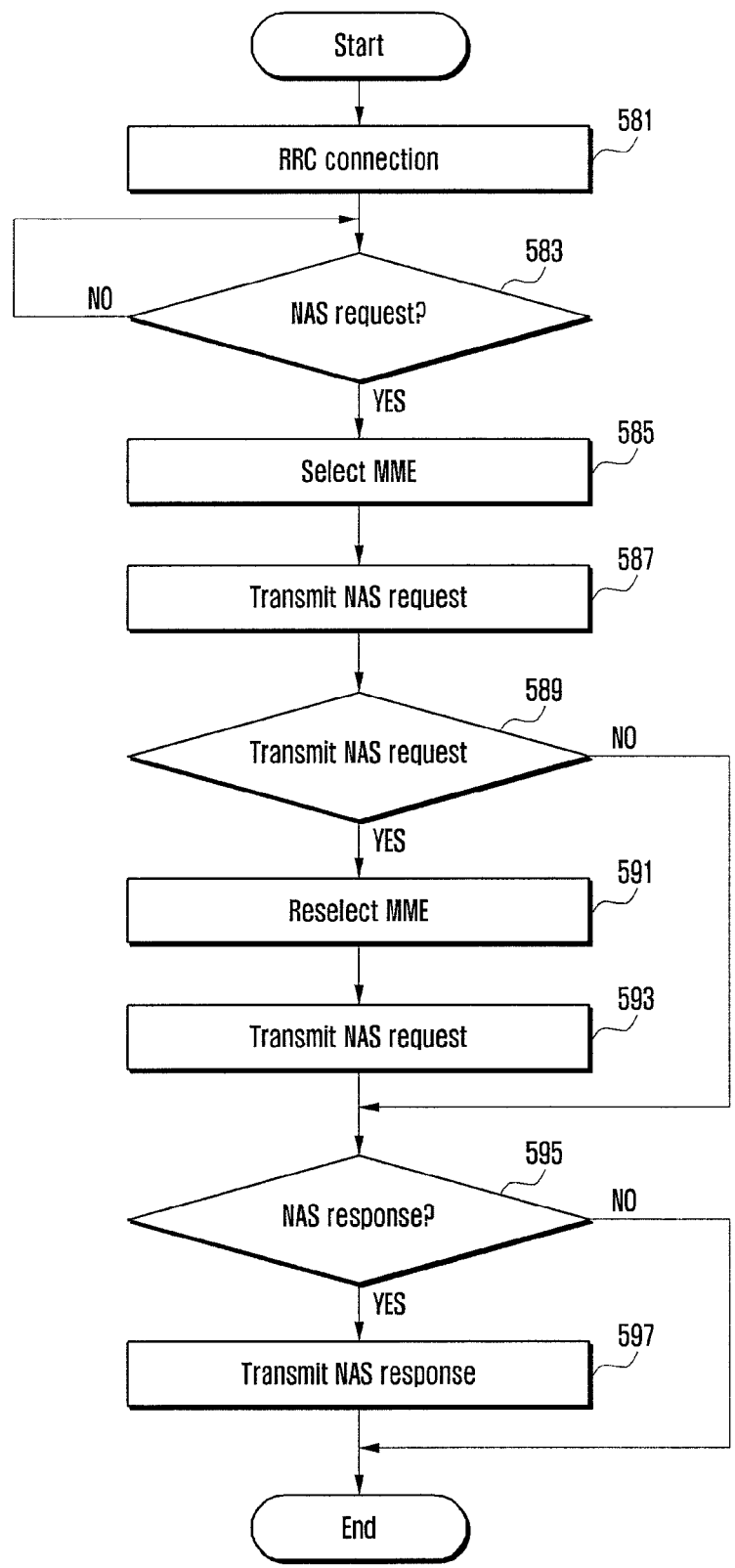
FIG. 14 is a flowchart illustrating the operation procedure of the eNB of FIG. 12.

FIG. 14 is a flowchart illustrating the operation procedure of the eNB 20 of FIG. 12.

Referring to FIG. 14, the eNB 20 tries to establish RRC connection with the UE 10 or 11 at step 581. Afterward, if a NAS request message is received from the UE 10 or 11, the eNB 20 detects this at step 583 and selects an MME 30, 31, or 33 at step 585. At this time, if an entity ID is received in the NAS request message, the eNB 20 selects the MME 30, 31, or 33 matched with the entity ID. If no entity ID is received, the eNB selects an MME entity 30, 31, or 33 arbitrarily. If an MTC indicator is received in the NAS request message, the eNB 20 selects the MTC MME 33. If no MTC indicator is received, the eNB 20 selects the normal MME 31. The eNB 20 delivers the NAS request message to the MME 30, 31, or 33 at step 587.

Next, if an MME reselection request message is received from the MME 30, 31, or 33, the eNB 20 detects this at step 589 and reselects an MME 30, 31, or 33 at step 591. At this time, the eNB 20 selects the MTC MME 33. At this time, if an entity ID is received in the MME reselection request message, the eNB 20 selects the MTC MME 33 matched with the entity ID. If no entity ID is received, the eNB 20 selects the MTC MME 33 arbitrarily. The eNB 20 delivers the NAS request message to the reselected MME 30, 31, or 33 at step 593.

Afterward, if a NAS response message is received from the MME 30, 31, or 33, the eNB detects this at step 595 and delivers the NAS response message to the UE 10 or 11 at step 597.

Although the description is directed to the case where the eNB 20 retransmits the NAS request message in the fifth embodiment of the present invention, the present invention is not limited thereto. That is, the present invention can be implemented in such a way that the MTC UE 11 retransmits the NAS request message. Such an example is described in the sixth embodiment of the present invention of the present invention.

Figure 15:
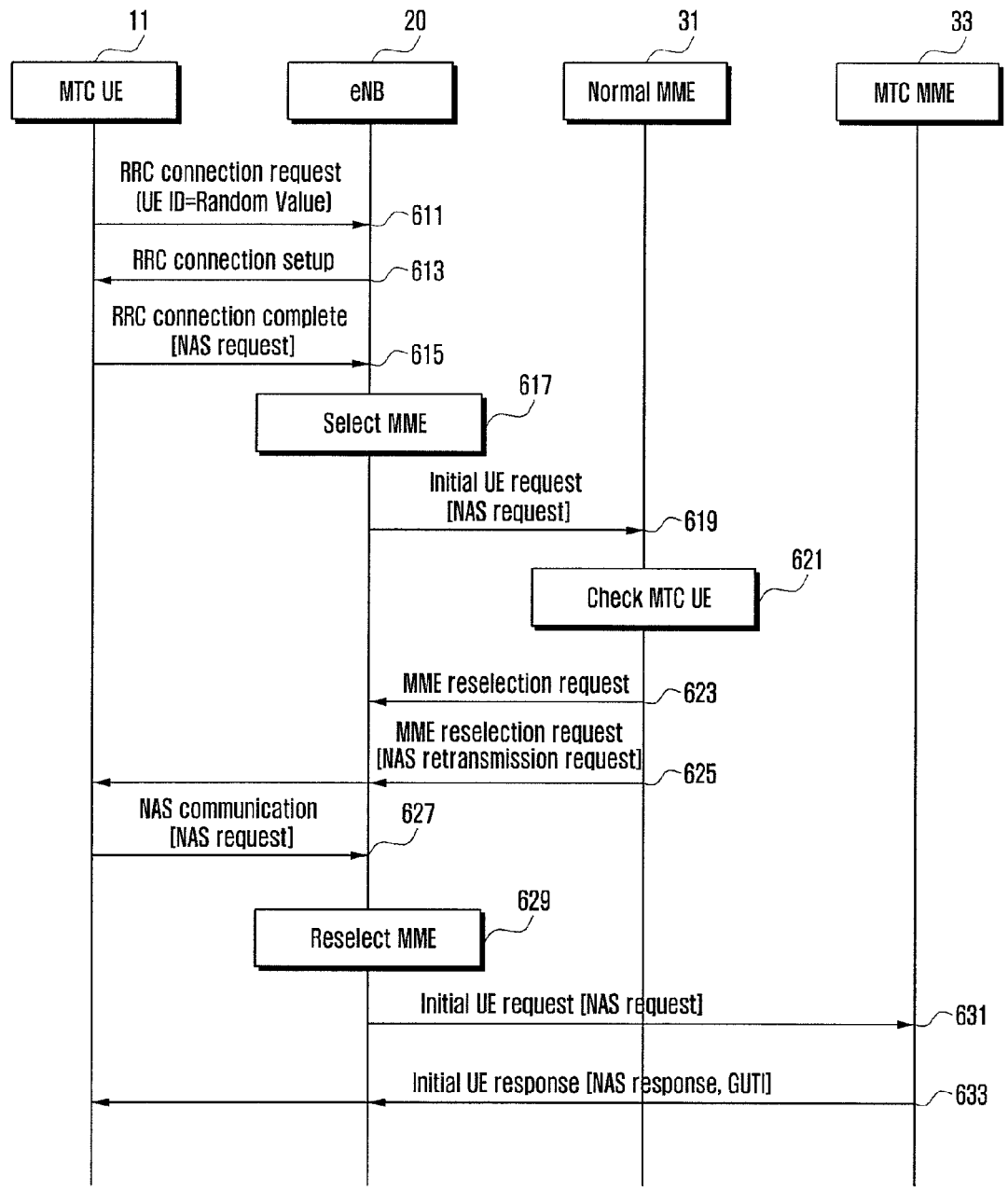
FIG. 15 is a signaling diagram illustrating a connection procedure in the wireless communication system according to the sixth embodiment of the present invention.

FIG. 15 is a signaling diagram illustrating a connection procedure in the wireless communication system according to the sixth embodiment of the present invention.

Referring to FIG. 15, the connection procedure between the MTC UE 11 and the MTC MME 33 starts in such a way that the MTC UE 11 attempts RRC connection to the eNB 20. At this time, when it attaches to the network initially or enters a cell supporting the tracking information which has not been recognized yet, the MTC UE 11 is capable of trying initial RRC connection to the eNB 20 to establish a connection to a new MME 30, 31, or 33.

That is, the MTC UE 11 sends an RRC connection request message to the eNB 20 at step 611. Since it is the initial connection attempt to the eNB 20, the MTC UE 11 transmits a random value as a UE ID in the RRC connection request message. If the RRC connection request message is received, the eNB 20 sends the MTC UE 11 an RRC connection setup message at step 613. If the RRC connection setup message is received, the MTC UE 11 sends the eNB 20 an RRC connection complete message at step 615. At this time, the MTC UE 11 transmits a NAS request message for the MTC MME 33 in the RRC connection complete message. Here, the MTC UE 11 is capable of transmitting the entity ID of the MME 30, 31, or 33 to which it has connected previously in the RRC connection complete message.

Next, if the MTC UE 11 has connected, the eNB 20 selects one of a plurality of MMEs 30, 31, and 33 at step 617. At this time, the eNB 20 determines whether the RRC connection complete message includes an entity ID. If an entity ID is included, the eNB 20 selects the MME 30, 31, or 33 matched with the entity ID. If no entity ID is included, the eNB 20 selects an MME 30, 31, or 31 arbitrarily. Also, if it has not connected with the MME 30, 31, or 33 matched with the entity ID through S1-MME interface, the eNB 20 selects an MME 30, 31, or 33 arbitrarily.

Once the normal MME 31 has been selected, the eNB 20 sends the normal MME 31 an initial UE request message for the MTC UE 11 at step 619. At this time, the eNB 20 delivers the NAS request message carried in the RRC connection complete message. If the initial UE request message is received, the normal MME 31 checks that the NAS request message carried in the initial UE request message has been transmitted by the MTC UE 11. For example, the eNB 20 transmits the MTC indicator received from the MTC UE 11 to the MME 31 such that the MME 31 identifies the MTC UE 11. Also, it is possible for the HSS to transmit the MTC indicator in the subscriber information of the MTC UE 11 to the normal MME 31 such that the normal MME 31 identifies the MTC UE 11. Also, it is possible for the MTC UE 11 to use a random value selected in the range discriminated from that for the normal UE as the UE ID such that the normal MME 31 identifies the MTC UE 11.

Next, if the MTC UE 11 has been identified, the normal MME 31 sends the eNB 20 a MME reselection request message at step 623. At this time, the normal MME 31 is capable of the information or the MTC MME 33, i.e. entity ID, in the MME reselection request message. Afterward, the normal 31 delivers the NAS retransmission request message to the MTC UE 11 at step 625. At this time, the normal MME 31 is capable of the NAS retransmission request message through NAS communication via the eNB 20. If the NAS retransmission request message is received, the MTC UE 11 retransmits the NAS request for the MTC MME 33 at step 627. At this time, the MTC UE 11 is capable of transmitting the NAS request message through NAS communication.

Next, if the retransmitted NAS request message is received, the eNB 20 selects one of the plural MMEs 30, 31, and 33 at step 629. At this time, the eNB 20 selects the MTC MME 33. Here, the eNB 20 determines whether the MME reselection request message includes an entity ID. If an entity ID is included, the eNB selects the MTC MME 33 matched with the entity ID. Otherwise, if no entity ID is included, the eNB 20 selects the MTC MME 33 arbitrarily. Also, if it has not connected to the MTC MME 33 matched with the entity ID through the S1-MME interface, the eNB selects the MTC MME 33 arbitrarily.

Once the MTC MME 33 has been selected, the eNB 20 sends the MTC MME 33 an initial UE request message for the MTC UE 11 at step 631. The MTC MME 33 sends the MTC UE 11 an initial UE response message via the eNB 20 at step 633. At this time, the MTC MME 33 generates the NAS response message by processing the request data in the NAS request message. The MTC MME 33 transmits the NAS response message in a NAS message. The MTC MME 33 is also capable of transmitting the NAS response message including a GUTI allocated as the identifier information of the MTC UE 11.

The MTC MME 11 is capable of retrying the RRC connection to the eNB 20. That is, when it wakes up, i.e. transitions from the idle mode to the active mode or enters the cell supporting the tracking area information which has been recognized previously, the MTC UE 11 is capable of retrying the RRC connection to the eNB 20 to reestablish the connection to the MME 30, 31, or 33 to which the MTC UE 11 has connected previously. The MTC UE 11 is capable of trying to connect to the MTC MME 33 via the eNB 20. Since the connection procedure between the MTC UE 11 and the MTC MME 33 is similar to steps 441 to 451 of FIG. 10 that has been described above, detailed description thereon is omitted herein.

The operation procedures of the normal MME 31 and the eNB 20 according to the present invention embodiment are described hereinafter. Since the operation procedure of the MTC MME 33 according to the present embodiment is similar to that of the first embodiment of the present invention, detailed description thereon is omitted herein.

Figure 16:
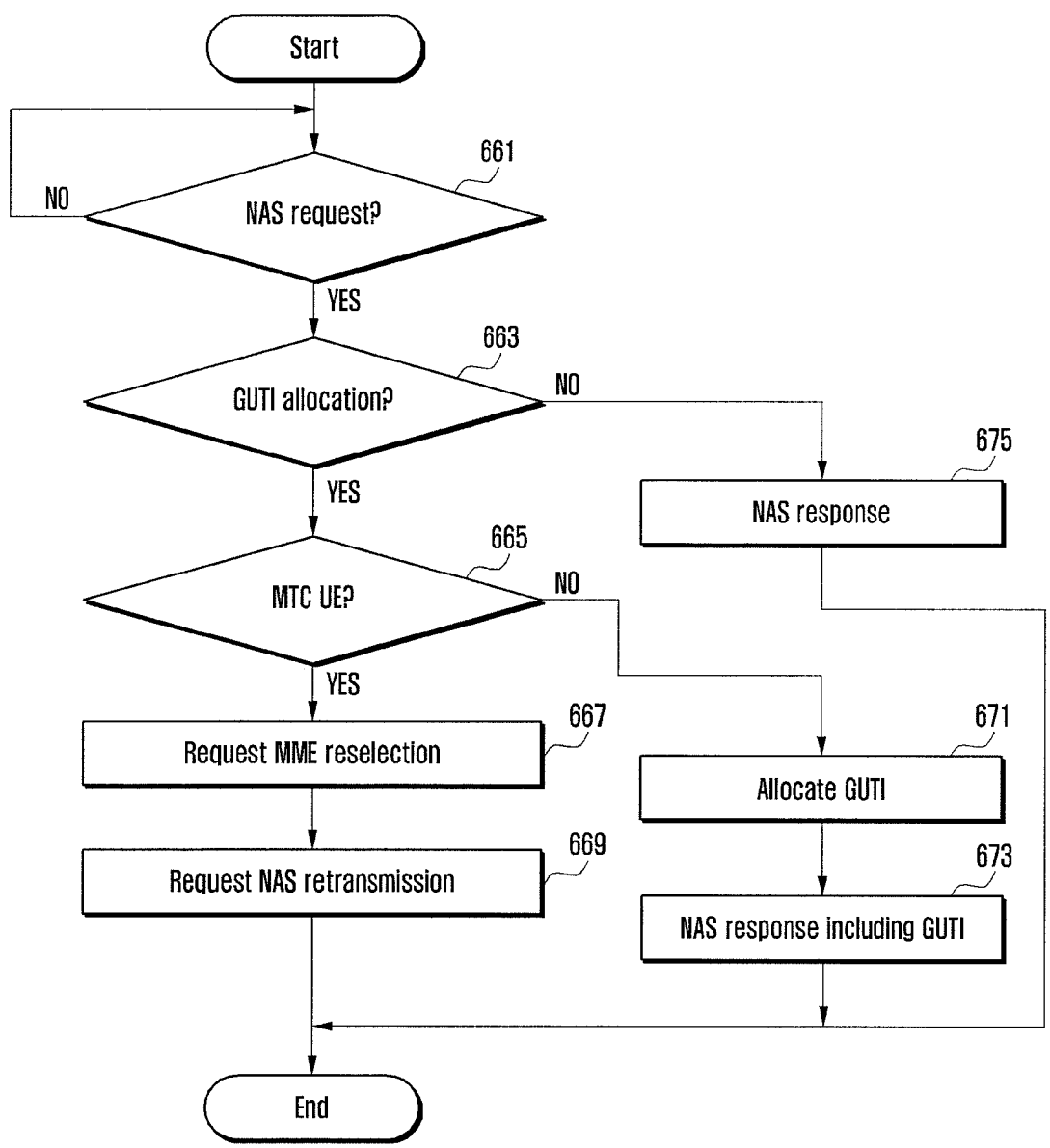
FIG. 16 is a flowchart illustrating the operation procedure of the normal MME of FIG. 15.

FIG. 16 is a flowchart illustrating the operation procedure of the normal MME 31 of FIG. 15.

Referring to FIG. 16, if a NAS request message is received from the UE 10 or 11, the normal me 31 detects this at step 661 and determines whether to allocate a GUTI to the UE 10 or 11 at step 663. That is, the normal MME 31 determines whether the UE 10 or 11 has been allocated a GUTI already. If it is determined to allocate a GUTI to the UE 10 or 11 at step 663, the normal MME 31 determines whether the UE 10 or 11 is the MTC UE 11 at step 665. If it is determined that the UE 10 or 11 is the MTC UE 11 at step 665, the normal MME 31 sends the eNB 20 an MME reselection request message at step 667. Next, the normal MME 31 sends the MTC UE 11 a NAS retransmission request message via the eNB 20 at step 669.

Otherwise, if it is determined that the UE 10 or 11 is no the MTC UE 11 at step 665, the normal MME 31 allocates a GUTI to the UE 10 or 11 at step 671. The normal MME 31 sends the UE 10 or 11 a NAS response message at step 673. At this time, the normal MME 31 transmits the NAS response message including the corresponding GUTI. If it is determined that there is no need to allocate a GUTI to the UE 10 or 11 at step 663, the normal MME 31 sends the UE 10 or 11 the NAS response message via the eNB 20 at step 675.

Figure 17:
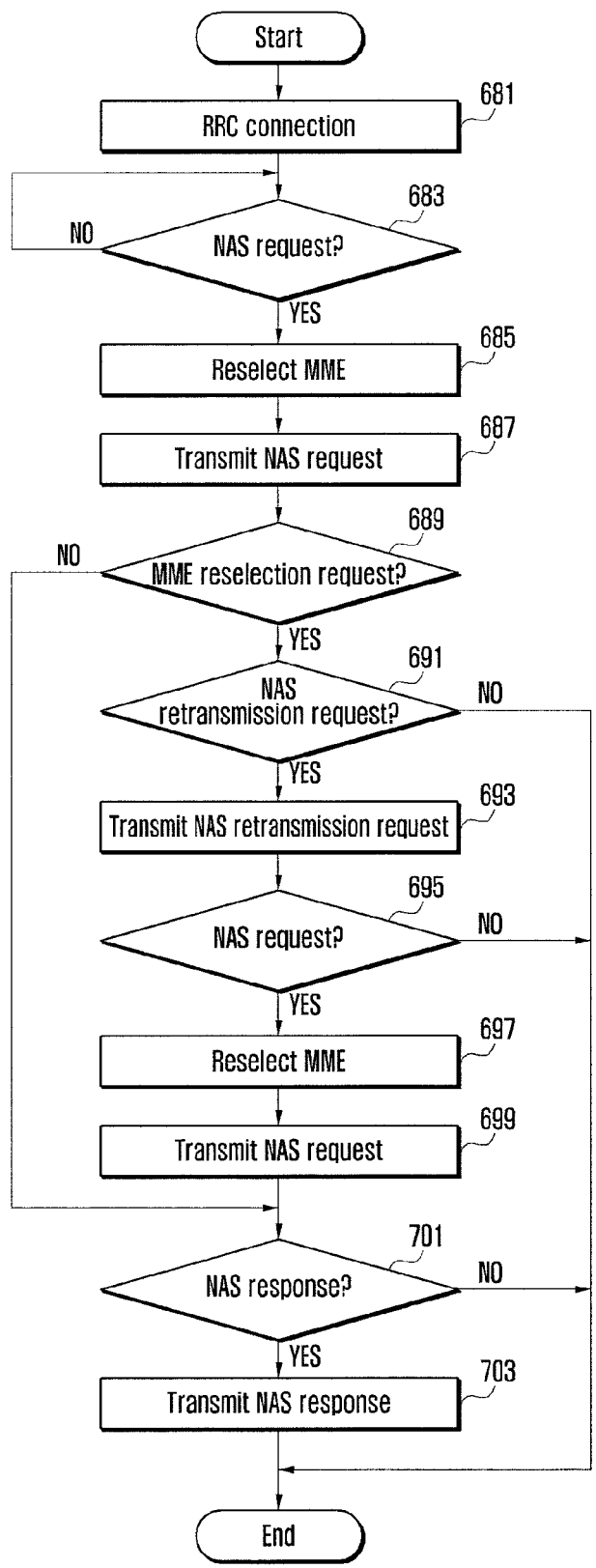
FIG. 17 is a flowchart illustrating the operation procedure of the eNB of FIG. 15.

FIG. 17 is a flowchart illustrating the operation procedure of the eNB 20 of FIG. 15.

Referring to FIG. 17, the eNB 20 establishes an RRC connection with the UE 10 or 11 at step 681. If a NAS request message is received from the UE 10 or 11, the eNB 20 detects this at step 683 and selects an MME 30, 31, or 33 at step 685. At this time, if an entity ID is received along with the NAS request message, the eNB 20 selects the MME 30, 31, or 33 matched with the entity ID. If no entity ID is received, the eNB 20 selects an MME 30, 31, or 33 arbitrarily. If an MTC indicator is received along with the NAS request message, the eNB 20 selects the MTC MME 33. If no MTC indicator is received, the eNB 20 selects the normal MME 31. The eNB 20 delivers the NAS request message to the MME 30, 31, or 33 at step 687.

Next, if an MME reselection request message is received from the MME 30, 31, or 33, the eNB 20 detects this at step 689. Afterward, if a NAS retransmission request message is received from the MME 30, 31, or 33, the eNB 20 detects this at step 691 and delivers the NAS retransmission request message to the MTC UE 11 at step 693. If a NAS request is received, the eNB 20 detects this at step 695 and reselects an MME 30, 31, or 33 at step 697. At this time, the eNB 20 selects the MTC MME 33. Here, if an entity ID is received in the MME reselection request message, the eNB 20 selects the MTC MME 33. Otherwise, if not entity ID is received, the eNB selects the MTC MME 33 arbitrarily. The eNB 20 delivers the NAS request message to the reselected entity 30, 31, or 33. If a NAS response message from the MME 30, 31, or 33, the eNB 20 detects this at step 701 and delivers the NAS response message to the UE 10 or 11 at step 703.

According to the above-described embodiments, it is possible to connect the MTC UE 11 to the MTC MME 33 efficiently in the wireless communication system. That is, the MTC UE 11 can connect to the MME 33 efficiently through cooperation between eNB 20 and normal MME 31 or normal MME 31 and MTC MME 33.

Although the description is directed to the connection procedure between MTC UE 11 and the MTC MME 33 in the wireless communication system, the present invention is not limited thereto. That is, the present invention also can be implemented by connecting the normal UE to the normal MME 31 efficiently through cooperation between the eNB 20 and the normal MME 31 or the normal MME 31 and MTC MME 33.

In the wireless communication system, it is possible for connecting the UE 10 or 11 to the MME 30, 31, or 33 corresponding to the supplementary function efficiently. That is, the UE 10 or 11 is capable being connected to the MME 30, 31, or 33 efficiently through cooperation between the eNB 20 and the MME 30, 31, or 33 or among the MMEs 30, 31, and 33 supporting different supplementary functions.

Although the descriptions have been directed to the case where the connection between the UE and the MME is established in association with a specific supplementary function, the present invention is not limited thereto. That is, the present invention can be implemented in such a way that the connection between the UE and the MME is established according to the load status of the MME.

For example, if the eNB request for the identity information of a UE, the MME checks the current load status. At this time, the MME determines whether the current load is greater than a predetermined threshold value, i.e. whether overload occurs. If it is determined that the current load is not greater than the threshold value, i.e. no overload occurs, the MME is capable of allocating the identity information to the UE. Otherwise, if it is determined that the current load is greater than the threshold value, i.e. overload occurs, the MME requests another MME for the identity information of the UE. That is, if overload occurs, the MME suspends the connection of the UE and request another MME for the identity information. In this way, the other MME is capable of allocating identity information to the UE. Here, the MME is capable of transmitting the identity information to the UE via the other MME. Furthermore, the UE is capable of trying connection to another MME using the corresponding identity information.

According to the present invention, it is possible to connect a UE to an MME efficiently in the wireless communication system. That is, the UE is capable of being connected to an MME efficiently through cooperation between the eNB and the MME or among the MMEs. At this time, the MMEs is capable of cooperating among each other according to the supportable supplementary function or load status.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A connection method of a base station comprising:
   receiving information from a user equipment (UE);
   identifying whether the UE is configured for a machine type communications (MTC) based on the information;
   selecting an MTC mobility management entity (MME) for the UE configured for the MTC based on the identifying to steer the UE configured for the MTC to the MTC MME; and
   transmitting, to the MTC MME, the information in a non-access stratum (NAS) signaling,
   wherein the information comprises an indicator indicating that the UE is configured for the MTC,
   wherein the information indicating that a radio resource control (RRC) connection establishment request corresponds to the MTC.

2. The connection method of claim 1, wherein the MTC MME is selected, based on a load of the MTC MME for load balancing.

3. The method of claim 1, wherein the information is received in at least one of a radio resource control (RRC) connection establishment signaling and a non-access stratum (NAS) signaling.

4. A connection method of a Mobility Management Entity (MME) comprising:
  receiving, from a base station, a request for controlling a user equipment (UE) configured for machine type communications (MTC); and
  transmitting a response to the base station,
  wherein the request is received, if the base station selects the MME for the UE configured for the MTC based on an identification whether the UE is configured for the MTC,
  wherein the identification is based on information received in a non-access stratum (NAS) signaling from the UE, and
  wherein the information comprises an indicator indicating that the UE is configured for the MTC, and
  wherein the information indicates that a radio resource control (RRC) connection establishment request corresponds to the MTC.

5. The method of claim 4, wherein the MME for the UE configured for the MTC is selected based on a load of the MME for load balancing.

6. The connection method of claim 4, wherein the MME is an MTC MME.

7. A base station comprising:
  a transceiver configured to perform communication; and
  a controller configured to control to receive information from a user equipment (UE), identify whether the UE is configured for a machine type communications (MTC) based on the information, selects an MTC mobility management entity (MME) for the UE configured for the MTC based on the identification to steer the UE configured for the MTC to the MTC MME, and to transmit, to the MTC MME, the information in a non-access stratum (NAS) signaling,
  wherein the information comprises an indicator indicating that the UE is configured for the MTC, and
  wherein the information indicating that a radio resource control (RRC) connection establishment request corresponds to the MTC.

8. The base station of claim 7, wherein the MTC MME is selected based on a load of the MTC MME for load balancing.

9. The base station of claim 7, wherein the information is received in at least one of a radio resource control (RRC) connection establishment signaling and a non-access stratum (NAS) signaling.

10. A Mobility Management Entity (MME) comprising:
  a transceiver configured to perform communication; and
  a controller configured to control to receive, from a base station, a request for controlling a user equipment (UE) configured for a machine type communications (MTC) and to transmit a response to the base station,
  wherein the request is received, if the base station selects the MME for the UE configured for the MTC based on an identification of whether the UE is configured for the MTC,
  wherein the identification is based on information received in a non-access stratum (NAS) signaling from the UE,
  wherein the information comprises an indicator indicating that the UE is configured for the MTC, and
  wherein information indicates that a RRC connection establishment request corresponds to the MTC.

11. The MME of claim 10, wherein the MME for the UE configured for the MTC is selected based on a load of the MME for load balancing.

12. The MME of claim 10, wherein the MME is an MTC MME.

13. A wireless communication system comprising:
  a user equipment (UE) connecting a base station; wherein the UE transmits the information in non-access stratum (NAS) signaling to a Mobility Management Entity (MME);
  the base station which receives information from the UE, identifies whether the UE is configured for a machine type communications (MTC) based on the information, selects an MTC mobility management entity (MME) for the UE configured for the MTC based on the identification to steer the UE configured for the MTC to the MTC MME, and
  the MTC MME which receives, from the base station, the request for controlling the UE configured for the MTC and to transmit a response to the base station,
  wherein the information comprises an indicator indicating that the UE is configured for the MTC, and
  wherein the information indicates that a RRC connection establishment request corresponds to the MTC.

14. The system of claim 13, wherein the MTC MME is selected based on a load of the MTC MME for load balancing.

15. The system of claim 13, wherein the information is received, by the base station, in at least one of a radio resource control (RRC) connection establishment signaling and NAS signaling.

* * * * *